US012043034B2

(12) United States Patent
Ishikawa

(10) Patent No.: US 12,043,034 B2
(45) Date of Patent: Jul. 23, 2024

(54) PRINTER, CONTROL METHOD, AND NON-TRANSITORY COMPUTER-READABLE MEDIUM STORING COMPUTER-READABLE INSTRUCTIONS

(71) Applicant: BROTHER KOGYO KABUSHIKI KAISHA, Nagoya (JP)

(72) Inventor: Akihiro Ishikawa, Nagoya (JP)

(73) Assignee: BROTHER KOGYO KABUSHIKI KAISHA, Nagoya (JP)

( * ) Notice: Subject to any disclaimer, the term of this patent is extended or adjusted under 35 U.S.C. 154(b) by 237 days.

(21) Appl. No.: 17/702,996

(22) Filed: Mar. 24, 2022

(65) Prior Publication Data

US 2022/0379615 A1 Dec. 1, 2022

(30) Foreign Application Priority Data

May 31, 2021 (JP) ................................. 2021-091859

(51) Int. Cl.
*B41J 2/165* (2006.01)

(52) U.S. Cl.
CPC ................................... *B41J 2/1652* (2013.01)

(58) Field of Classification Search
CPC ... B41J 2/1652; B41J 2/16538; B41J 2/16526
See application file for complete search history.

(56) References Cited

U.S. PATENT DOCUMENTS 11,141,977 B2 * 10/2021 Sawada ................ B41J 2/16541

FOREIGN PATENT DOCUMENTS

JP 2015157383 A * 9/2015
JP 2021030595 A 3/2021

* cited by examiner

*Primary Examiner* — Sharon Polk
(74) *Attorney, Agent, or Firm* — K&L Gates LLP

(57) ABSTRACT

A printer is provided with a first nozzle surface including a first nozzle row, a second nozzle surface including a second nozzle row positioned with respect to the first nozzle row in a main scanning direction, a receiver having a width smaller than an interval between the first nozzle row and the second nozzle row, and a driver. A processor of the printer causes the driver to perform a discharge driving to discharge ink from at least one of nozzles of one of the first nozzle row or the second nozzle row, and causes the driver to perform a non-discharge driving to not discharge ink from at least one of nozzles of the other of the first nozzle row or the second nozzle row, in a state of one of the first nozzle row or the second nozzle row being caused to face the receiver in a discharge direction.

10 Claims, 17 Drawing Sheets

PRINTER, CONTROL METHOD, AND NON-TRANSITORY COMPUTER-READABLE MEDIUM STORING COMPUTER-READABLE INSTRUCTIONS

CROSS-REFERENCE TO RELATED APPLICATION

This application claims priority to Japanese Patent Application No. 2021-091859 filed May 31, 2021. The contents of the foregoing application are hereby incorporated herein by reference.

BACKGROUND

The present disclosure relates to a printer, a control method, and a non-transitory computer-readable medium storing computer-readable instructions.

A printer is provided with a plurality of ink heads and a capping device. The plurality of ink heads are aligned in a main scanning direction. A nozzle surface is provided at each of the plurality of ink heads. A plurality of nozzles are aligned in a sub-scanning direction in the nozzle surface. The capping device can move in the main scanning direction relative to the plurality of ink heads. As a result of the ink heads performing a flushing operation in a state in which the capping device faces the plurality of ink heads in the up-down direction, the capping device receives ink discharged from the plurality of ink heads. In other words, the capping device functions as a member for receiving the ink discharged from the ink heads by the flushing operation.

SUMMARY

In the above-described printer, it is conceivable that, in a state in which some of the plurality of ink heads are separated from the capping device, the flushing operation may be performed by the other ink heads facing the capping device. In this case, during the performing of the flushing operation by the other ink heads, of the plurality of ink heads, the some of the ink heads, of the plurality of ink heads, are in a state of being exposed to the atmosphere. Thus, as a result of the ink drying out inside some of the nozzles, of the plurality of ink heads, in subsequent processing, there is a possibility of an ink discharge failure occurring by the some of the nozzles.

Embodiments of the broad principles derived herein provide a printer, a control method, and a non-transitory computer-readable medium storing computer-readable instructions that are capable of suppressing an ink discharge failure.

A first aspect of the present disclosure relates to a printer. The printer includes a first nozzle surface, a second nozzle surface, a flushing receiving member, a driver, a processor, and a memory. The first nozzle surface includes a first nozzle row configured by a plurality of nozzles discharging ink in a discharge direction being aligned in a sub-scanning direction orthogonal to the discharge direction. The second nozzle surface includes a second nozzle row configured by a plurality of the nozzles being aligned in the sub-scanning direction. The second nozzle row is positioned, with respect to the first nozzle row, in a main scanning direction orthogonal to the sub-scanning direction and the discharge direction. The flushing receiving member is configured to move in the main scanning direction relative to the first nozzle surface and the second nozzle surface. The flushing receiving member is a member provided with a receiver having a width smaller than an interval between the first nozzle row and the second nozzle row in the main scanning direction. The driver is configured to perform discharge driving of discharging the ink from the nozzles and non-discharge driving of not discharging the ink from the nozzles. The memory stores computer-readable instructions that, when executed by the processor, cause the processor to perform a process. The process includes first flushing processing. The first flushing processing is processing performed in a state of a first target nozzle row being caused to face the receiver in the discharge direction. The first target nozzle row is one of the first nozzle row or the second nozzle row. The first flushing processing causes the driver to perform the discharge driving to discharge the ink from at least one of the nozzles of the first target nozzle row and causes the driver to perform the non-discharge driving to not discharge the ink from at least one of the nozzles of a second target nozzle row. The second nozzle row is the other of the first nozzle row or the second nozzle row.

According to the first aspect, during the first flushing processing, the discharge driving is performed by the driver to discharge the ink from at least one of the nozzles of the first target nozzle row. In this way, the printer can suppress an ink discharge failure in the at least one of the nozzles of the first target nozzle row. Furthermore, during the first flushing processing, the non-discharge driving is performed by the driver to not discharge the ink from at least one of the nozzles of the second target nozzle row. In this way, the printer can suppress the ink inside the at least one of the nozzles of the second target row from being in a dry state. As a result, the printer can suppress the ink discharge failure in the at least one of the nozzles of the second nozzle row. Thus, the printer can suppress the ink discharge failure.

A second aspect of the present disclosure relates to a control method of a printer including a first nozzle surface, a second nozzle surface, a flushing receiving member, and a driver. The first nozzle surface includes a first nozzle row configured by a plurality of nozzles discharging ink in a discharge direction being aligned in a sub-scanning direction orthogonal to the discharge direction. The second nozzle surface includes a second nozzle row configured by a plurality of the nozzles being aligned in the sub-scanning direction, the second nozzle row being positioned, with respect to the first nozzle row, in a main scanning direction orthogonal to the sub-scanning direction and the discharge direction. The flushing receiving member moves in the main scanning direction relative to the first nozzle surface and the second nozzle surface and is a member provided with a receiver having a width smaller than an interval between the first nozzle row and the second nozzle row in the main scanning direction. The driver performs discharge driving of discharging the ink from the nozzles, and non-discharge driving of not discharging the ink from the nozzles. The control method includes first flushing processing. The first flushing processing is processing performed in a state of a first target nozzle row being caused to face the receiver in the discharge direction. The first target nozzle row is one of the first nozzle row or the second nozzle row. The first flushing processing causes the driver to perform the discharge driving to discharge the ink from at least one of the nozzles of the first target nozzle row and causes the driver to perform the non-discharge driving to not discharge the ink from at least one of the nozzles of a second target nozzle row. The second target nozzle row being the other of the first nozzle row or the second nozzle row.

The second aspect can achieve the same effects as those of the first aspect.

A third aspect of the present disclosure relates to a non-transitory computer-readable medium storing computer-readable instructions that, when executed by a computer of a printer, cause the computer to perform a process. The printer includes a first nozzle surface, a second nozzle surface, a flushing receiving member, and a driver. The first nozzle surface includes a first nozzle row configured by a plurality of nozzles discharging ink in a discharge direction being aligned in a sub-scanning direction orthogonal to the discharge direction. The second nozzle surface includes a second nozzle row configured by a plurality of the nozzles being aligned in the sub-scanning direction. The second nozzle row is positioned, with respect to the first nozzle row, in a main scanning direction orthogonal to the sub-scanning direction and the discharge direction. The flushing receiving member is configured to move in the main scanning direction relative to the first nozzle surface and the second nozzle surface. The flushing receiving member is a member provided with a receiver having a width smaller than an interval between the first nozzle row and the second nozzle row in the main scanning direction. The driver is configured to perform discharge driving of discharging the ink from the nozzles and non-discharge driving of not discharging the ink from the nozzles. The process includes first flushing processing. The first flushing processing is processing performed in a state of a first target nozzle row being caused to face the receiver in the discharge direction. The first target nozzle row is one of the first nozzle row or the second nozzle row. The first flushing processing causes the driver to perform the discharge driving to discharge the ink from at least one of the nozzles of the first target nozzle row and causes the driver to perform the non-discharge driving to not discharge the ink from at least one of the nozzles of a second target nozzle row. The second target nozzle row being the other of the first nozzle row or the second nozzle row.

The third aspect can achieve the same effects as those of the first aspect.

BRIEF DESCRIPTION OF THE DRAWINGS

Embodiments will be described below in detail with reference to the accompanying drawings in which.

DETAILED DESCRIPTION

Figure 1:
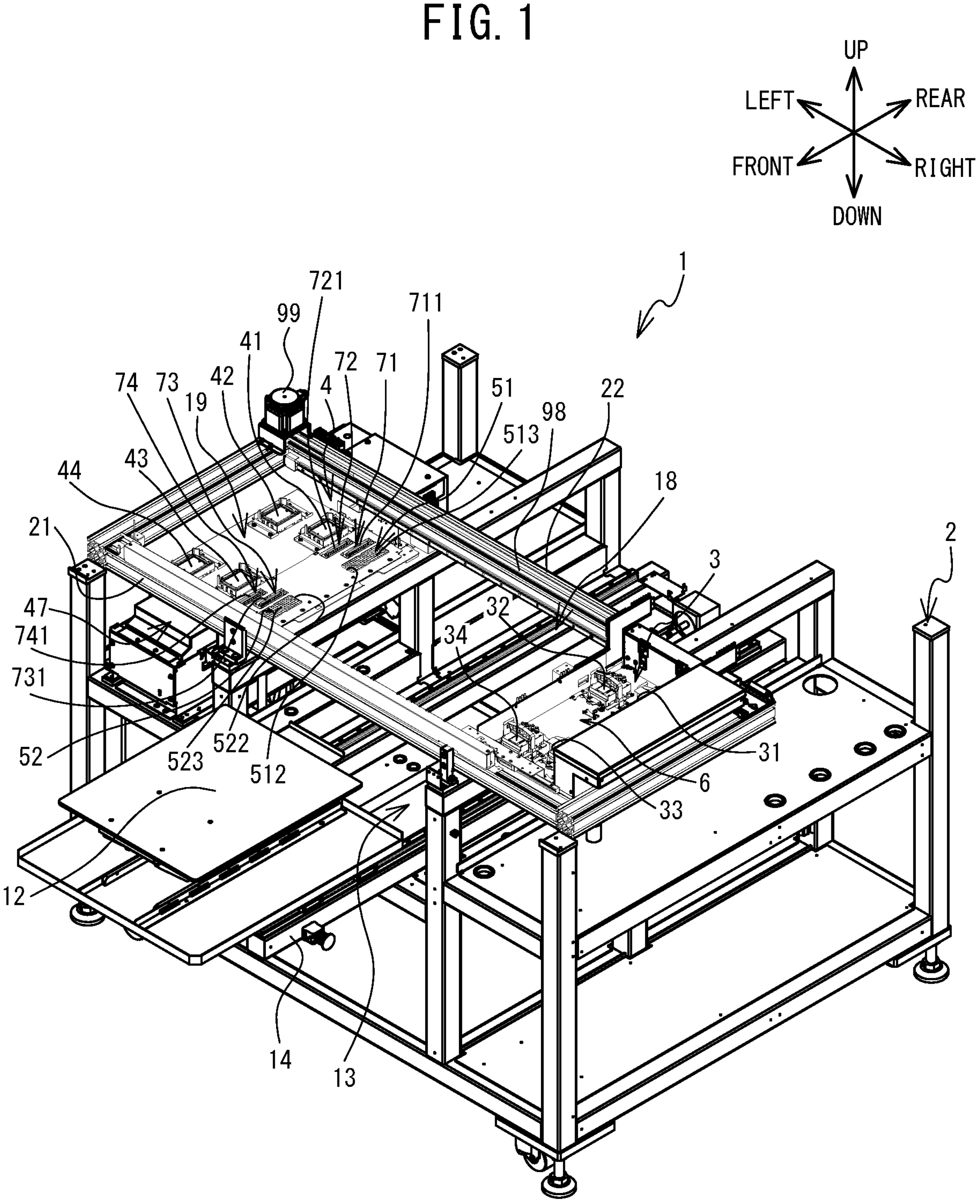
FIG. 1 is a perspective view of a printer.

A printer 1 related to one embodiment of the present disclosure will be described with reference to the drawings. The directions of up, down, lower left, upper right, lower right, and upper left in FIG. 1 correspond to the upper side, lower side, front, rear, right, and left, respectively, of the printer 1. The up-down direction in FIG. 1 is the vertical direction. In the present embodiment, the mechanical elements in the drawings are shown at actual scale.

The printer 1 shown in FIG. 1 is an inkjet printer, and performs printing by discharging ink onto a print medium. The print medium is a cloth, paper, or the like, and is a T-shirt, for example. The printer 1 can print a color image on the print medium using five colors of ink, i.e., white, black, yellow, cyan, and magenta.

Hereinafter, of the five colors of ink, the white-colored ink will be referred to as "white ink". When collectively referring to, of the five colors of ink, the other four colors of ink, i.e., black, cyan, yellow, and magenta, or when neither is specified, they will be referred to as "color ink". When collectively referring to the white ink and the color ink, or when neither is specified, they will simply be referred to as "ink". The white ink is used for printing as a white part of an image or as a base for the color ink. The color ink is used for printing a color image and is discharged directly onto the print medium or onto a base of white ink.

Figure 2:
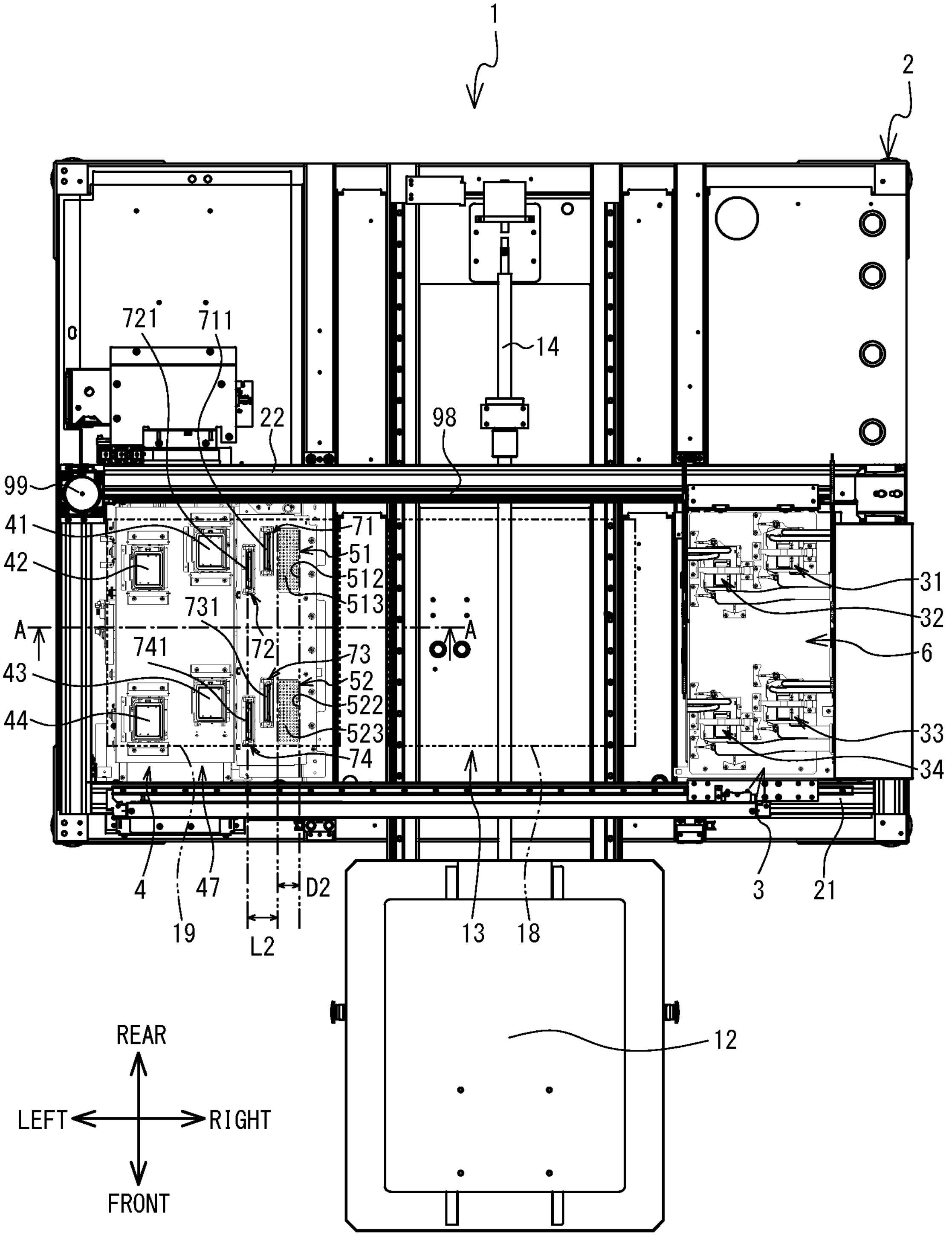
FIG. 2 is a plan view of the printer.

A mechanical configuration of the printer 1 will be explained with reference to FIG. 1 to FIG. 4. As shown in FIG. 1 and FIG. 2, the printer 1 is provided with a frame body 2, and a platen 12. The frame body 2 is configured in a lattice shape by a plurality of shafts extending in the front-rear direction, the left-right direction, and the up-down direction. An opening 13 is formed in the frame body 2. The opening 13 is positioned in a central portion of the frame body 2 in a front view, and extends from the front end of the frame body 2 toward the rear. The platen 12 is disposed inside the opening 13 in a front view. The platen 12 has a plate shape, and extends in the front-rear direction and the left-right direction. The platen 12 is supported, from below, by a support portion 14. The support portion 14 is fixed to the frame body 2 inside the opening 13. The support portion 14 is a shaft, and extends in the front-rear direction. The platen 12 moves in the front-rear direction along the support portion 14 as a result of being driven by a sub-scanning motor 97 shown in FIG. 5. Thus, the front-rear direction of the present embodiment is the sub-scanning direction.

A pair of guide shafts 21 and 22 are fixed to the upper end of the frame body 2. The guide shaft 21 is disposed at a front end portion of the frame body 2 and extends in the left-right direction from the left end to the right end of the frame body 2. The guide shaft 22 is disposed substantially at the center of the frame body 2 in the front-rear direction, and is positioned further to the rear than the guide shaft 21. The guide shaft 22 extends in the left-right direction from the left end to the right end of the frame body 2. The guide shafts 21 and 22 support the carriage 6. The carriage 6 has a plate shape and extends in the front-rear direction and the left-right direction. The carriage 6 extends from the guide shaft 21 to the guide shaft 22.

A drive belt 98 is connected to a rear end portion of the carriage 6. The drive belt 98 is provided on the guide shaft 22 and extends in the left-right direction. The left end portion of the drive belt 98 is connected to a main scanning motor 99. The main scanning motor 99 is provided on the left end portion of the guide shaft 22. Driving the main scanning motor 99 causes the drive belt 98 to move the carriage 6 in the left-right direction along the guide shaft 21 and the guide shaft 22. Therefore, in the present embodiment, the left-right direction is the main scanning direction. FIG. 1 and FIG. 2 show a state in which the carriage 6 is positioned on the right end of the moving range.

White heads 31 and 32, and color heads 33 and 34 are provided at the carriage 6. Each of the white heads 31 and 32, and the color heads 33 and 34 have the same configuration, and in the present embodiment, have a cuboid shape. Hereinafter, when the white heads 31 and 32, and the color heads 33 and 34 are collectively referred to, or when no particular head is specified, they are referred to as a "head 3" or "heads 3." The white heads 31 and 32 are positioned at a rear portion of the carriage 6. The white head 31 is positioned at a rear right portion of the carriage 6. The white head 32 is positioned further to the left than the white head 31, and is displaced to the front with respect to the white head 31. The rear portion of the white head 32 overlaps, in the left-right direction, with the front portion of the white head 31.

The color heads 33 and 34 are positioned to the front of the white heads 31 and 32. The color heads 33 and 34 are respectively positioned at the same positions, in the left-right direction, as the white heads 31 and 32. The color head 34 is positioned further to the left than the color head 33, and is displaced to the front with respect to the color head 33. The rear portion of the color head 34 overlaps, in the left-right direction, with the front portion of the color head 33.

Figure 3:
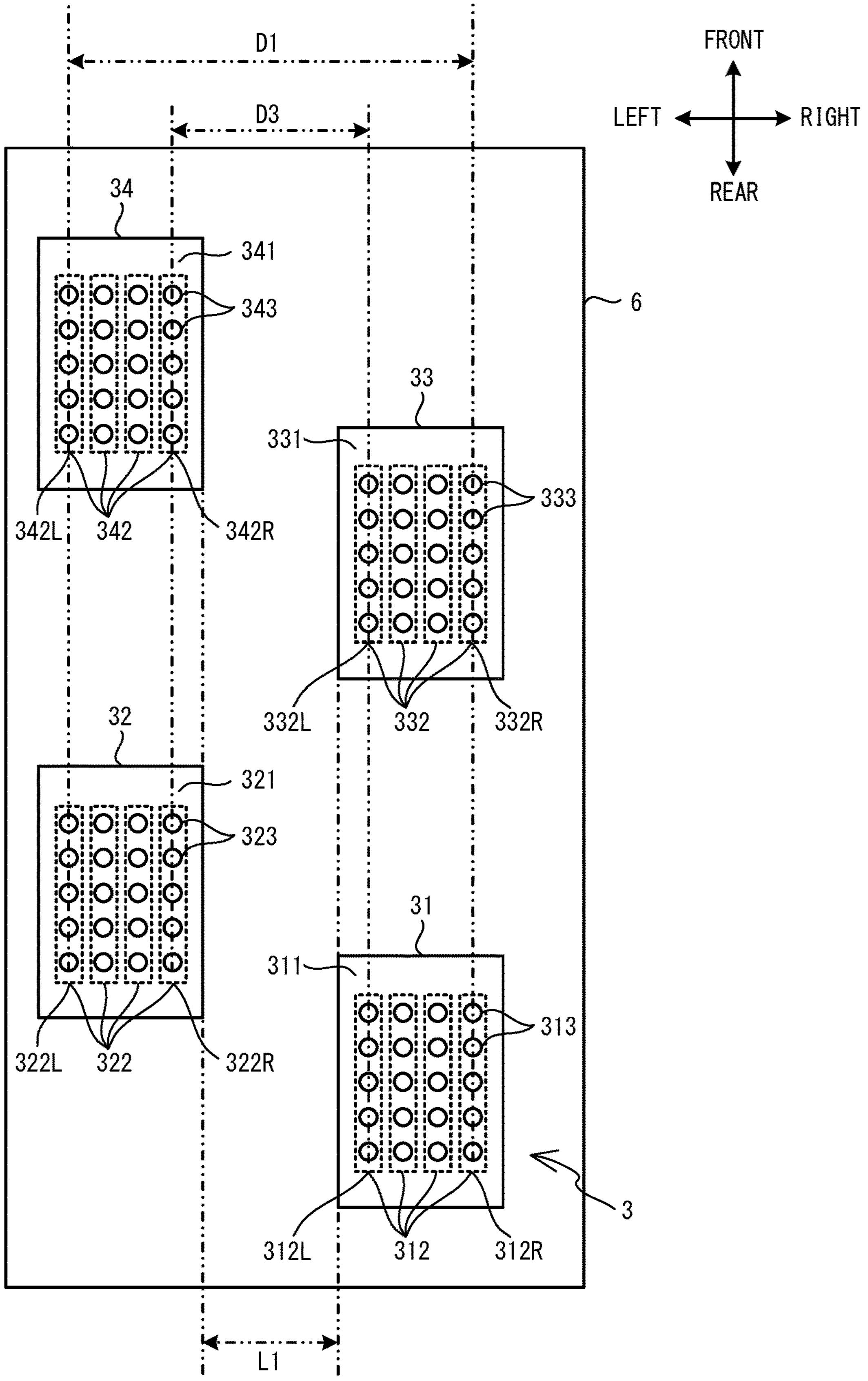
FIG. 3 is a schematic diagram of a carriage as seen from below.

As shown in FIG. 3, a nozzle surface 311 is provided at the lower surface of the white head 31. The nozzle surface 311 extends in the front-rear direction and the left-right direction. A plurality of nozzle rows 312 are formed in the nozzle surface 311. The plurality of nozzle rows 312 are aligned in the left-right direction and include a nozzle row 312R and a nozzle row 312L. The nozzle row 312R is positioned furthest to the right side, of the plurality of nozzle rows 312. The nozzle row 312L is positioned furthest to the left side, of the plurality of nozzle rows 312. The plurality of nozzle rows 312 are configured by a plurality of nozzles 313 arranged in a single column in the front-rear direction. White ink corresponds to each of the plurality of nozzle rows 312. The plurality of nozzles 313 are openings, and discharge the white ink downward.

In a similar manner to the configuration of the white head 31, nozzle surfaces 321, 331, and 341 are respectively provided at the lower surfaces of the white head 32 and the color heads 33 and 34. The nozzle surfaces 321, 331, and 341 extend in the front-rear direction and the left-right direction. A plurality of nozzle rows 322, 332, and 342 are respectively formed in the nozzle surfaces 321, 331, and 341. The plurality of nozzle rows 322, 332, and 342 are arranged in the left-right direction, respectively, and include nozzle rows 322R, 332R, 342R, and nozzle rows 322L, 332L, and 342L.

The nozzle row 322R is positioned furthest to the right side, of the plurality of nozzle rows 322. The nozzle row 332R is positioned furthest to the right side, of the plurality of nozzle rows 332. The nozzle row 342R is positioned furthest to the right side, of the plurality of nozzle rows 342. The nozzle row 322L is positioned furthest to the left side, of the plurality of nozzle rows 322. The nozzle row 332L is positioned furthest to the left side, of the plurality of nozzle rows 332. The nozzle row 342L is positioned furthest to the left side, of the plurality of nozzle rows 342. The plurality of nozzle rows 322, 332, and 342 are respectively configured by a plurality of nozzles 323, 333, and 343 arranged in a single column in the front-rear direction.

The white ink corresponds to each of the plurality of nozzle rows 322. In other words, the plurality of nozzles 323 discharge the white ink downward. Different colored color inks correspond to the plurality of nozzle rows 332, respectively. In other words, the plurality of nozzles 333 discharge, downward, color ink of a color corresponding to each of the plurality of nozzle rows 332. Different colored color inks correspond to the plurality of nozzle rows 342, respectively. In other words, the plurality of nozzles 343 discharge, downward, color ink of a color corresponding to each of the plurality of nozzle rows 342.

In the left-right direction, a distance between the center of the nozzle row 312R and the center of the nozzle row 322L is referred to as a "nozzle row maximum distance D1." In the left-right direction, a distance between the center of the nozzle row 332R and the center of the nozzle row 342L is the same as the nozzle row maximum distance D1. The nozzle row 312R is positioned furthest to the right side, of the plurality of nozzle rows 312 and 322 aligned in the left-right direction. The nozzle row 332R is positioned furthest to the right side, of the plurality of nozzle rows 332 and 342 aligned in the left-right direction. The nozzle row 322L is positioned furthest to the left side, of the plurality of nozzle rows 312 and 322 aligned in the left-right direction. The nozzle row 342L is positioned furthest to the left side, of the plurality of nozzle rows 332 and 342 aligned in the left-right direction. In other words, the nozzle row maximum distance D1 is the largest distance among each of respective distances between the plurality of nozzle rows 312 and the plurality of nozzle rows 322 aligned in the left-right direction. The nozzle row maximum distance D1 is the largest distance among each of respective distances between the plurality of nozzle rows 332 and the plurality of nozzle rows 342 aligned in the left-right direction.

In the left-right direction, a distance between the center of the nozzle row 312L and the center of the nozzle row 322R is referred to as a "nozzle row minimum distance D3." In the left-right direction, a distance between the center of the nozzle row 332L and the center of the nozzle row 342R is the same as the nozzle row minimum distance D3. The nozzle row minimum distance D3 is smaller than the nozzle row maximum distance D1. The nozzle row minimum distance D3 is the smallest distance among each of the respective distances between the plurality of nozzle rows 312 and the plurality of nozzle rows 322 aligned in the left-right direction. The nozzle row minimum distance D3 is the smallest distance among each of the respective distances between the plurality of nozzle rows 332 and the plurality of nozzle rows 342 aligned in the left-right direction.

In the left-right direction, an interval L1 between the white head 31 and the white head 32 indicates an interval from the left end of the nozzle surface 311 and the right end of the nozzle surface 321. In the present embodiment, in the left-right direction, the interval L1 between the white head 31 and the white head 32 is the same as an interval between the color head 33 and the color head 34. In other words, in the left-right direction, the interval L1 between the white head 31 and the white head 32 is the same as an interval from the left end of the nozzle surface 331 to the right end of the nozzle surface 341.

According to the above-described configuration, as shown in FIG. 1 and FIG. 2, the heads 3 move in the left-right direction together with the carriage 6. A region in which a movement path of the platen 12 in the left-right direction overlaps, in the up-down direction, with a movement path of the heads 3 in the front-rear direction is referred to as a "printing region 18." Of the movement path of the heads 3, a region that is further to the left than the movement path of the platen 12 is referred to as a "non-printing region 19." When the heads 3 and the platen 12 are positioned in the printing region 18, the platen 12 and the heads 3 face each other in the up-down direction.

Figure 5:
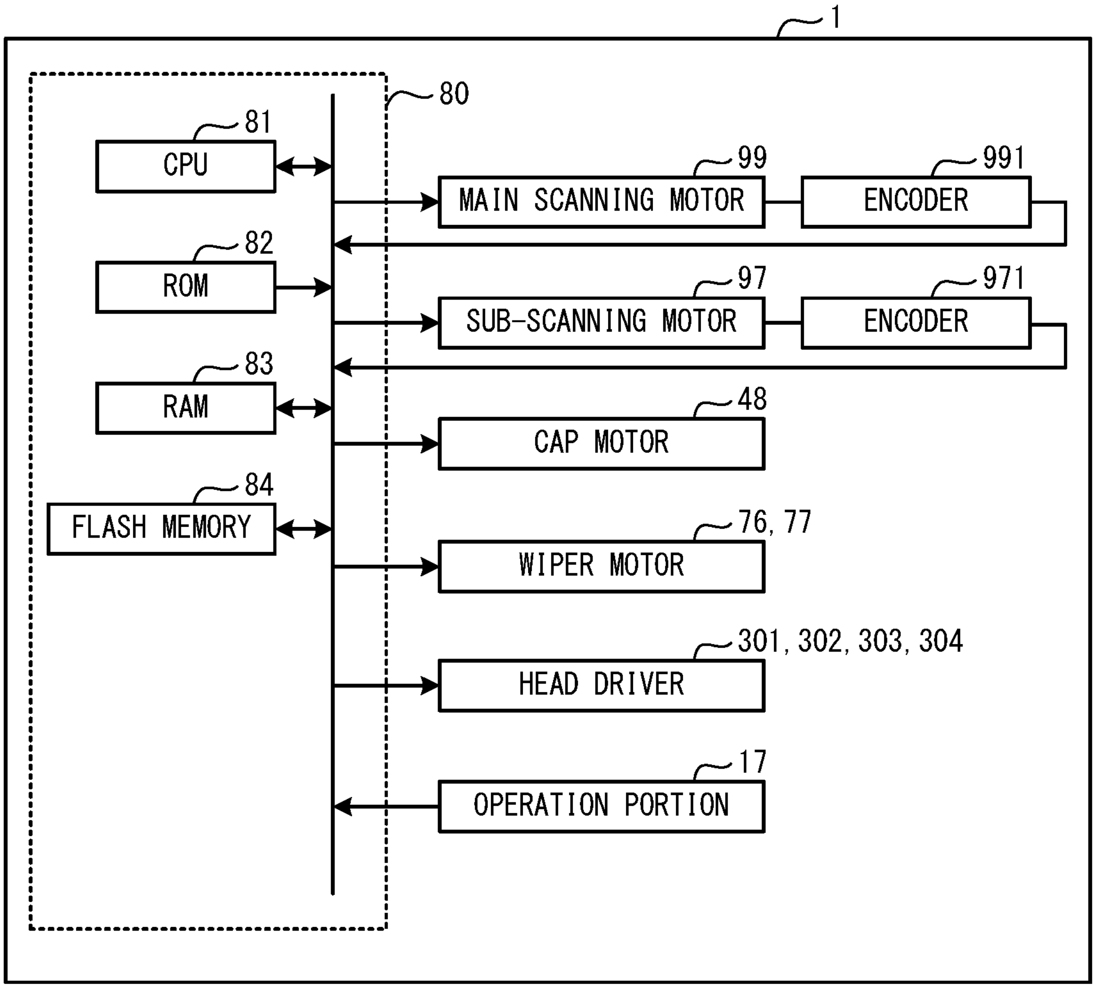
FIG. 5 is a block diagram illustrating an electrical configuration of the printer.

In the printing region 18, the printer 1 conveys a print medium relative to the heads 3 in the front-rear direction and the left-right direction, by moving the platen 12 in the front-rear direction (the sub-scanning direction) by the driving of the sub-scanning motor 97 shown in FIG. 5, and by moving the carriage 6 in the left-right direction (the main scanning direction) by the driving of the main scanning motor 99.

An operation in which the carriage 6 moves in the left-right direction while discharging the ink from the heads 3 is referred to as "discharge scanning." The printer 1 performs printing on the print medium by repeating the discharge scanning and the movement of the platen 12 in the front-rear direction. For example, the printer 1 forms a base image on the print medium by discharging the white ink from the white heads 31 and 32 in the discharge scanning. The printer 1 prints a color image by discharging the color inks from the color heads 33 and 34 onto the base image formed on the print medium in the discharge scanning.

As shown in FIG. 1 and FIG. 2, the printer 1 is provided with a cap mechanism 4. The cap mechanism 4 is provided in the non-printing region 19, and is provided with a cap support portion 47 and caps 41, 42, 43, and 44. The cap support portion 47 has a plate shape and extends in the front-rear direction and the left-right direction. The cap support portion 47 is positioned lower than the guide shafts 21 and 22 in the non-printing region 19, and extends from a position in the vicinity of the rear side of the guide shaft 21 to a position in the vicinity of the front side of the guide shaft 22. The cap support portion 47 moves in the up-down direction (refer to FIG. 7 and FIG. 8) as a result of the driving of a cap motor 48 shown in FIG. 5.

The caps 41 to 44 are fixed to the upper surface of the cap support portion 47. The caps 41 to 44 are positioned, in the front-rear direction, in the same positions as the white heads 31 and 32 and the color heads 33 and 34, respectively. Positional relationships between each of the caps 41 to 44 are the same as positional relationships between the white heads 31 and 32 and the color heads 33 and 34. The caps 41 to 44 are configured by an elastic body, such as rubber or the like, for example, and are open upward.

According to the above-described configuration, when the carriage 6 moves to the left end of a movement range, the white heads 31 and 32, and the color heads 33 and 34 are respectively positioned above the caps 41, 42, 43, and 44, and face the caps 41, 42, 43, and 44 in the up-down direction. A position of the carriage 6 in which the white heads 31 and 32 and the color heads 33 and 34 respectively face the caps 41, 42, 43, and 44 in the up-down direction is referred to as a "cap position" (refer to FIG. 7 and FIG. 8). Note that the cap position is defined by a position of the center, in the left-right direction, of the carriage 6. In a similar manner, a first flushing position (refer to FIG. 9), a second flushing position (refer to FIG. 10), and a turn-back position (refer to FIG. 11), all of which are to be described later, are defined by the position of the center, in the left-right direction, of the carriage 6.

Figure 7:
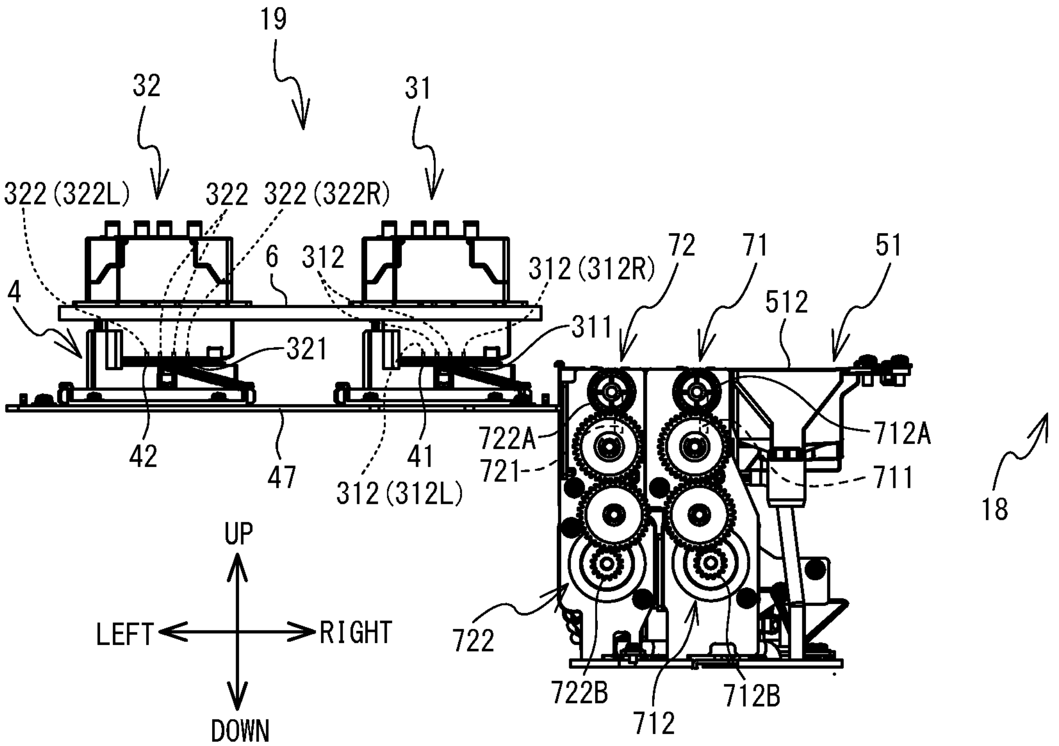
FIG. 7 is a diagram in the direction of arrows along a line A-A shown in FIG. 2 when the carriage is positioned at a cap position, and is a diagram showing a case which is a capping state and in which wipers are in a retracted posture.

When the cap support portion 47 moves upward in a state in which the carriage 6 is at the cap position, the caps 41, 42, 43, and 44 adhere closely to the nozzle surfaces 311, 321, 331, and 341 of the white heads 31 and 32 and the color heads 33 and 34, respectively (refer to FIG. 7). "Adhere closely to" means, for example, that the caps 41, 42, 43, and 44 are in contact with the nozzle surfaces 311, 321, 331, and 341 to an extent that a pressure difference between the interior and exterior of the caps 41, 42, 43, and 44 can be maintained. In this way, capping by the caps 41 to 44 is performed. During a period in which the printing is not performed, the printer 1 performs the capping by the caps 41 to 44, in order to suppress the drying out of the ink.

Figure 4:
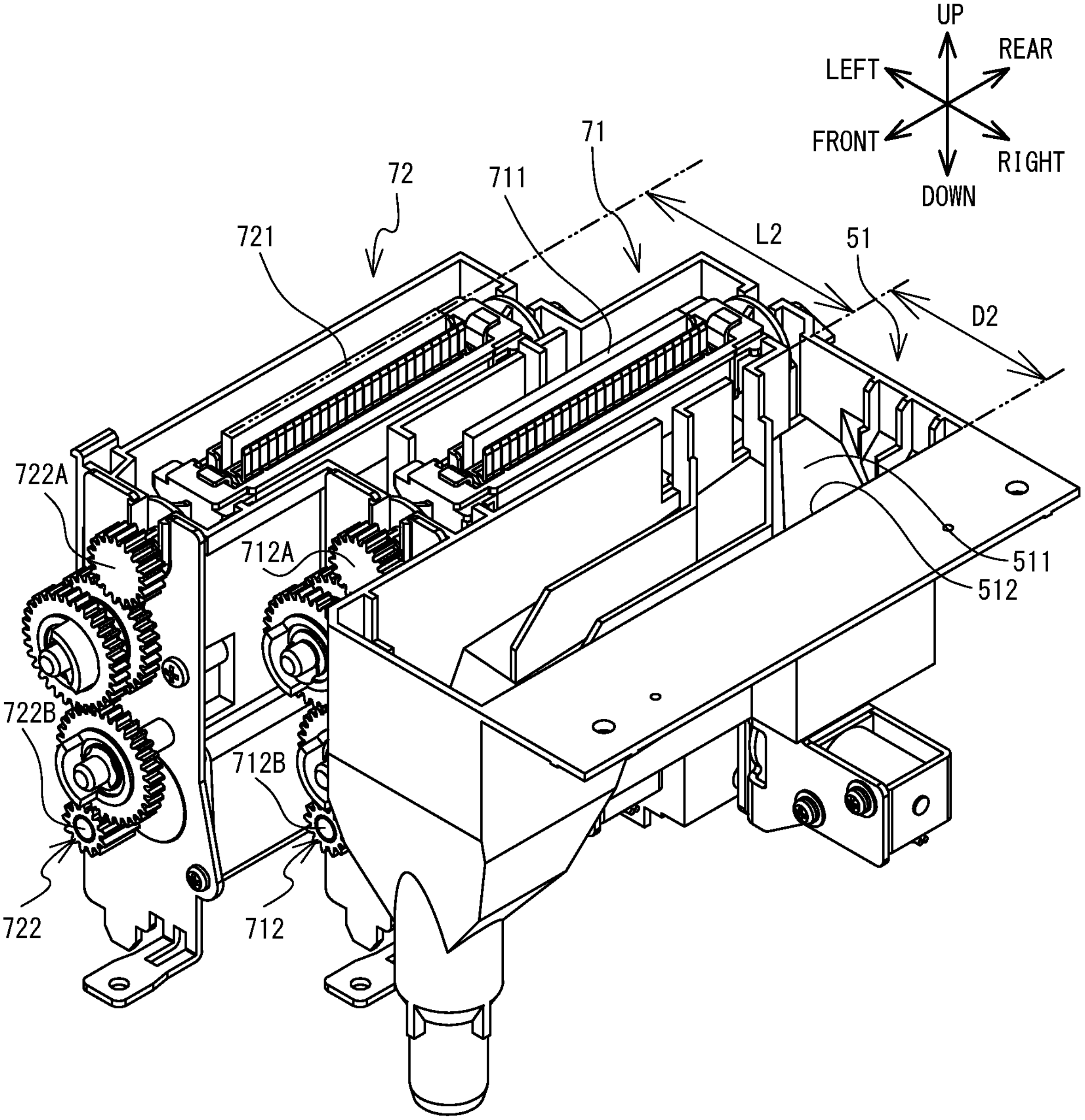
FIG. 4 is a perspective view of wiper mechanisms, and a flushing box.

As shown in FIG. 1 and FIG. 2, the printer 1 is provided with wiper mechanisms 71, 72, 73, and 74. The wiper mechanisms 71 to 74 are provided in the non-printing region 19 and each have the same configuration. As shown in FIG. 4, the wiper mechanisms 71 and 72 are respectively provided with wipers 711 and 721, and a plurality of gears 712 and 722. The wipers 711 and 721 have elasticity and are configured by rubber, a porous member, or the like.

As shown in FIG. 2, the wiper 711 is positioned further to the right than the cap 41. The wiper 711 is positioned in the same position, in the front-rear direction, as the cap 41 and the white head 31. The length of the wiper 711 in the front-rear direction is the same as the length, in the front-rear direction, of the nozzle surface 311 shown in FIG. 3, or is longer than the length of the nozzle surface 311 in the front-rear direction.

The wiper 721 is positioned further to the right than the cap 42, and further to the left than the wiper 711. In the present embodiment, the wiper 721 is positioned further to the right than the cap 41. The wiper 721 is positioned in the same position, in the front-rear direction, as the cap 42 and the white head 32. The length of the wiper 721 in the front-rear direction is the same as the length of the nozzle surface 321, in the front-rear direction, or is longer than the length of the nozzle surface 321 in the front-rear direction.

As shown in FIG. 4, the wiper 711 is coupled to a gear 712A that is furthest to the upper side, of the plurality of gears 712. A wiper motor 76 shown in FIG. 5 is coupled to a gear 712B that is furthest to the lower side, of the plurality of gears 712. In this way, the plurality of gears 712 are coupled to the wiper motor 76 shown in FIG. 5 and to the wiper 711, and transmits a driving force of the wiper motor 76 to the wiper 711.

The wiper 721 is coupled to a gear 722A that is furthest to the upper side, of the plurality of gears 722. A wiper motor 77 shown in FIG. 5 is coupled to a gear 722B that is furthest to the lower side, of the plurality of gears 722. In this way, the plurality of gears 722 are coupled to the wiper motor 77 shown in FIG. 5 and to the wiper 721, and a driving force of the wiper motor 77 is transmitted to the wiper 721.

As shown in FIG. 1 and FIG. 2, in a similar manner to the wiper mechanisms 71 and 72, the wiper mechanisms 73 and 74 are respectively provided with wipers 731 and 741, and a plurality of gears (not shown in the drawings). The wiper 731 is positioned further to the right than the cap 43. In the present embodiment, the wiper 731 is positioned at the same position as the wiper 711 in the left-right direction. The wiper 731 is positioned at the same position as the cap 43 and the color head 33 in the front-rear direction.

The wiper 741 is positioned further to the right than the cap 44, and further to the left than the wiper 731. In the present embodiment, the wiper 741 is positioned further to the right than the cap 43, and is positioned at the same position as the wiper 721 in the left-right direction. The wiper 741 is positioned at the same position as the cap 44 and the color head 34 in the front-rear direction.

The plurality of gears of the wiper mechanism 73 are coupled to the wiper motor 76 shown in FIG. 5, and to the wiper 731, and transmit the driving force of the wiper motor 76 to the wiper 731. The plurality of gears of the wiper mechanism 74 are coupled to the wiper motor 77 shown in FIG. 5, and to the wiper 741, and transmit the driving force of the wiper motor 77 to the wiper 741.

According to the above-described configuration, the wipers 711 and 731 rotate in the clockwise direction or in the counter-clockwise direction in a front view, due to the driving force of the wiper motor 76. Rotation shafts of the wipers 711 and 731 are positioned lower than the nozzle surfaces 311 and 331 shown in FIG. 3, and extend in the front-rear direction. The wipers 721 and 741 rotate in the clockwise direction or in the counter-clockwise direction in a front view, due to the driving force of the wiper motor 77. Rotation shafts of the wipers 721 and 741 are positioned lower than the nozzle surfaces 321 and 341 shown in FIG. 3, and extend in the front-rear direction.

Hereinafter, a posture of each of the wipers 711, 721, 731, and 741 in which the leading ends of each of the wipers 711, 721, 731, and 741 are positioned lower than the nozzle surfaces 311, 321, 331, and 341 shown in FIG. 3 is referred to as a "retracted posture" (refer to FIG. 7, for example). In the present embodiment, when each of the wipers 711, 721, 731, and 741 is in the retracted posture, the leading end of each of the wipers 711, 721, 731, and 741 is oriented downward. In this case, even when the white heads 31 and 32 and the color heads 33 and 34 shown in FIG. 2 move in the left-right direction with respect to the wipers 711, 721, 731, and 741, each of the nozzle surfaces 311, 321, 331, and 341 pass above the wipers 711, 721, 731, and 741. As a result, the wipers 711, 721, 731, and 741 do not come into contact with the nozzle surfaces 311, 321, 331, and 341, respectively.

Hereinafter, a posture of the wipers 711, 721, 731, and 741 in which the leading ends of each of the wipers 711, 721, 731, and 741 are positioned at the same height as or above the nozzle surfaces 311, 321, 331, and 341 shown in FIG. 3 is referred to as a "contact posture" (refer to FIG. 4). As shown in FIG. 4, in the present embodiment, when each of the wipers 711 and 721 is in the contact posture, the leading end of each of the wipers 711 and 721 is oriented upward. In a similar manner, when each of the wipers 731 and 741 shown in FIG. 2 is in the contact posture, the leading end of each of the wipers 731 and 741 is oriented upward. In this case, when the white heads 31 and 32 and the color heads 33 and 34 shown in FIG. 2 move in the left-right direction with respect to the wipers 711, 721, 731, and 741, the wipers 711, 721, 731, and 741 come into contact with the nozzle surfaces 311, 321, 331, and 341, respectively. In this way, the wipers 711, 721, 731, and 741 wipe the nozzle surfaces 311, 321, 331, and 341.

As shown in FIG. 4, each of the wipers 711 and 721 enter into the contact posture by rotating in the clockwise direction, in a front view, from the retracted posture. Each of the wipers 711 and 721 enters into the retracted posture by rotating in the counter-clockwise direction in a front view, from the contact posture. In a similar manner, each of the wipers 731 and 741 shown in FIG. 2 also enters the contact posture by rotating in the clockwise direction, in a front view, from the retracted posture. Each of the wipers 731 and 741 enters the retracted posture by rotating in the counter-clockwise direction, in a front view, from the contact posture.

As shown in FIG. 1 and FIG. 2, the printer 1 is provided with flushing boxes 51 and 52. The flushing boxes 51 and 52 are provided in the non-printing region 19 and below the movement path of the heads 3 in the left-right direction, and each has the same configuration. The flushing box 51 is positioned further to the right than the wipers 711 and 721, and further to the left than the platen 12. The flushing box 52 is positioned further to the right than the wipers 731 and 741, and further to the left than the platen 12. The flushing box 52 is positioned further to the front than the flushing box 51.

As shown in FIG. 4, the flushing box 51 is a cuboid box shape. A recessed portion 511 is formed in the flushing box 51. The recessed portion 511 is recessed downward from the upper surface of the flushing box 51. In other words, the flushing box 51 is open upward. Hereinafter, a region surrounded by the upper edge of the recessed portion 511 is referred to as a "receiver 512." The receiver 512 has a rectangular shape in a plan view.

As shown in FIG. 1 and FIG. 2, an absorption member 513 is provided at the recessed portion 511 shown in FIG. 4. Illustration of the absorption member 513 is omitted in FIG. 4. The absorption member 513 is a porous member, such as a sponge or the like. The absorption member 513 absorbs the white ink discharged from the white heads 31 and 32 by a discharge flushing operation to be described later.

The flushing box 52 has the same configuration as the flushing box 51. In other words, a recessed portion (not shown in the drawings) is also formed in the flushing box 52. A receiver 522 is a region surrounded by the upper edge of the recessed portion. An absorption member 523 is provided at the recessed portion of the flushing box 52. The absorption member 523 absorbs the color inks discharged from the color heads 33 and 34 by the discharge flushing operation to be described later.

In the left-right direction, a width D2 of the receiver 512 indicates a distance from the left end to the right end of the receiver 512. In the present embodiment, in the left-right direction, the width D2 of the receiver 512 is the same as the width of the receiver 522, and the widths of the absorption members 513 and 523 are substantially the same. In the left-right direction, the width D2 of the receiver 512 is smaller than the nozzle row maximum distance D1 shown in FIG. 3. In the present embodiment, in the left-right direction, the width D2 of the receiver 512 is smaller than the nozzle row minimum distance D3 shown in FIG. 3.

In the left-right direction, an interval L2 between the wiper 721 and the flushing box 51 indicates an interval from the rotation shaft of the wiper 721 to the left end of the receiver 512. In the left-right direction, the interval L2 between the wiper 721 and the flushing box 51 is the same as an interval between the wiper 741 and the flushing box 52. In other words, in the left-right direction, the interval L2 between the wiper 721 and the flushing box 51 is the same as an interval from the rotation shaft of the wiper 741 to the left end of the receiver 522. In the left-right direction, the interval L2 between the wiper 721 and the flushing box 51 is smaller than the interval L1 between the white head 31 and the white head 32 (refer to FIG. 3).

The electrical configuration of the printer 1 will be explained with reference to FIG. 5. The printer 1 is provided with a control board 80. A CPU 81, a ROM 82, a RAM 83, and a flash memory 84 are provided on the control board 80. The CPU 81 controls the printer 1 and is electrically connected to the ROM 82, the RAM 83, and the flash memory 84. The ROM 82 stores a control program used for the CPU 81 to control operations of the printer 1, and various pieces of information and the like needed by the CPU 81 when executing various programs. The ROM 82, for example, stores each of positions of the carriage 6, on the basis of a rotation angle of the main scanning motor 99, and stores each of positions of the platen 12, on the basis of a rotation angle of the sub-scanning motor 97. The RAM 83 temporarily stores various data used by the control program. The flash memory 84 is a non-volatile memory, and stores print data for performing the printing, and the like.

The main scanning motor 99, the sub-scanning motor 97, the cap motor 48, the wiper motors 76 and 77, head drivers 301, 302, 303, and 304, and an operation portion 17 are electrically connected to the CPU 81. The main scanning motor 99, the sub-scanning motor 97, the cap motor 48, the wiper motors 76 and 77, and the head drivers 301 to 304 are driven by control by the CPU 81.

Encoders 991 and 971 are respectively provided in the main scanning motor 99 and the sub-scanning motor 97. The encoder 991 detects the rotation angle of the main scanning motor 99, and outputs a detection result to the CPU 81. The encoder 971 detects the rotation angle of the sub-scanning motor 97, and outputs a detection result to the CPU 81. The head drivers 301 to 304 are configured by piezoelectric elements or heating elements, for example. As a result of the head drivers 301 to 304 being driven, the inks are respectively discharged from the white heads 31 and 32 and the color heads 33 and 34.

The operation portion 17 is a touch panel and the like, and outputs information, to the CPU 81, in accordance with an operation by a user. By the user operating the operation portion 17, a print command for starting the printing by the printer 1 and the like can be input to the printer 1.

Ink discharge failures will be described. A state in which solvent components in the ink volatilize, and a concentration of solid components, such as pigment particles and the like, in the ink becomes locally increased is referred to as a "dry state." A state in which the solid components, such as the pigment particles and the like, in the ink are locally precipitated is referred to as a "precipitated state." For example, when the ink in the nozzle in the head 3 is exposed to the atmosphere, the solvent components volatilize from the ink in the nozzle via a meniscus, and the ink inside the nozzle is in the dry state. For example, when the ink inside the nozzle in the head 3 is retained, the pigment particles in the ink precipitate in the vicinity of the meniscus, and the ink inside the nozzle is in the precipitated state. In these cases, in the head 3, the fluidity of the ink in the vicinity of the meniscus inside the nozzle deteriorates locally. Thus, in the head 3, it is easier for a discharge failure to occur in which the ink is not discharged from the nozzle.

In the present embodiment, as the solid components such as the pigment particles and the like, the white ink includes components having a higher likelihood of precipitation than the components included in the color inks. A component having the higher likelihood of precipitation is titanium oxide, for example. Titanium oxide is an inorganic pigment having a comparatively high specific gravity. The white ink includes the components having the higher likelihood of precipitation, and thus, the solid components such as the pigment particles and the like in the white ink are more likely to precipitate. In other words, the white ink is more likely to be in the precipitated state than the color inks. As a result, the fluidity of the white ink is more likely to deteriorate than the fluidity of the color inks. Thus, in the present embodiment, the ink discharge failure is more likely to occur in the white heads 31 and 32 than in the color heads 33 and 34.

The flushing operations will be described. The flushing operations include the discharge flushing operation and a non-discharge flushing operation. The discharge flushing operation is an operation to discharge the ink from the nozzles of the heads 3 by driving the head drivers 301 to 304. When the discharge flushing operation is performed, the ink that is in the dry state or in the precipitated state is discharged from the nozzles. In this way, the dry state or the precipitated state of the ink inside the nozzles is resolved.

The non-discharge flushing operation is an operation in which the ink is not discharged from the nozzles of the heads 3, and is an operation in which the ink inside the nozzles of the heads 3 is caused to oscillate by the driving of the head drivers 301 to 304. When the non-discharge flushing operation is performed, the ink in the vicinity of the meniscus that is in the dry state or the precipitated state is mixed with the ink that is further upstream than the meniscus as is not in the dry state or the precipitated state. In this way, the dry state or the precipitated state of the ink inside the nozzles is resolved.

Hereinafter, causing the head driver 301, for example, to perform the discharge flushing operation is also referred to as "causing the discharge flushing operation to be performed with respect to the white head 31." Causing the head driver 301, for example, to perform the non-discharge flushing operation is also referred to as "causing the non-discharge flushing operation to be performed with respect to the white head 31." Not causing the head driver 301, for example, to perform either the discharge flushing operation or the non-discharge flushing operation is referred to as "not causing the discharge flushing operation or the non-discharge flushing operation to be performed with respect to the white head 31." The causing of the discharge flushing operation and the non-discharge flushing operation by the head drivers 302 to 304 with respect to the white head 32 and the color heads 33 and 34 is expressed in the same manner.

Main processing will be described with reference to FIG. 6 to FIG. 16. When the operation portion 17 is operated by the user and the print command is input to the printer 1, the CPU 81 performs the main processing by reading out and executing the control program from the ROM 82.

In the left-right direction, in each of positions in which the carriage 6 is positioned, a positional relationship of the color heads 33 and 34 with respect to the wiper mechanisms 73 and 74, the caps 43 and 44, and the flushing box 52 is the same as a positional relationship of the white heads 31 and 32 with respect to the wiper mechanisms 71 and 72, the caps 41 and 42, and the flushing box 51. Thus, the positional relationship of the color heads 33 and 34 with respect to the wiper mechanisms 73 and 74, the caps 43 and 44, and the flushing box 52 (not shown in the drawings) corresponds to the positional relationship of the white heads 31 and 32 with respect to the wiper mechanisms 71 and 72, the caps 41 and 42, and the flushing box 51 shown in FIG. 7 to FIG. 14.

Figure 8:
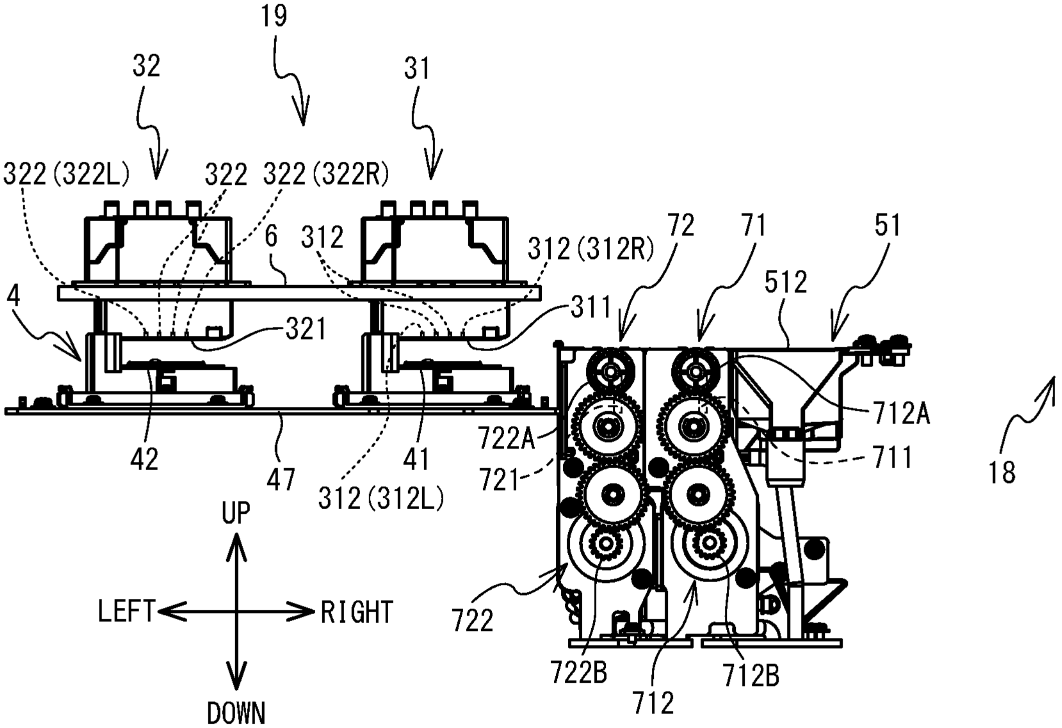
FIG. 8 is a diagram in the direction of arrows along the line A-A shown in FIG. 2 when the carriage is positioned at the cap position, and is a diagram showing a case which is an uncapping state and in which the wipers are in the retracted posture.

Hereinafter, as shown in FIG. 7, a state in which the capping is being performed by the caps 41 to 44, that is, a state in which each of the caps 41, 42, 43 and 44 adheres closely, from below, to the nozzle surfaces 311, 321, 331, and 341 of the white heads 31 and 32, and the color heads 33 and 34, is referred to as a “capping state.” As shown in FIG. 8, a state in which the capping is not being performed by the caps 41 to 44, that is, a state in which each of the caps 41 to 44 is separated downward from the nozzle surfaces 311, 321, 331, and 341, is referred to as an “uncapping state.” As shown in FIG. 7, the main processing is started, for example, in the state in which the wipers 711, 721, 731 and 741 are in the retracted posture in the capping state.

Figure 6:
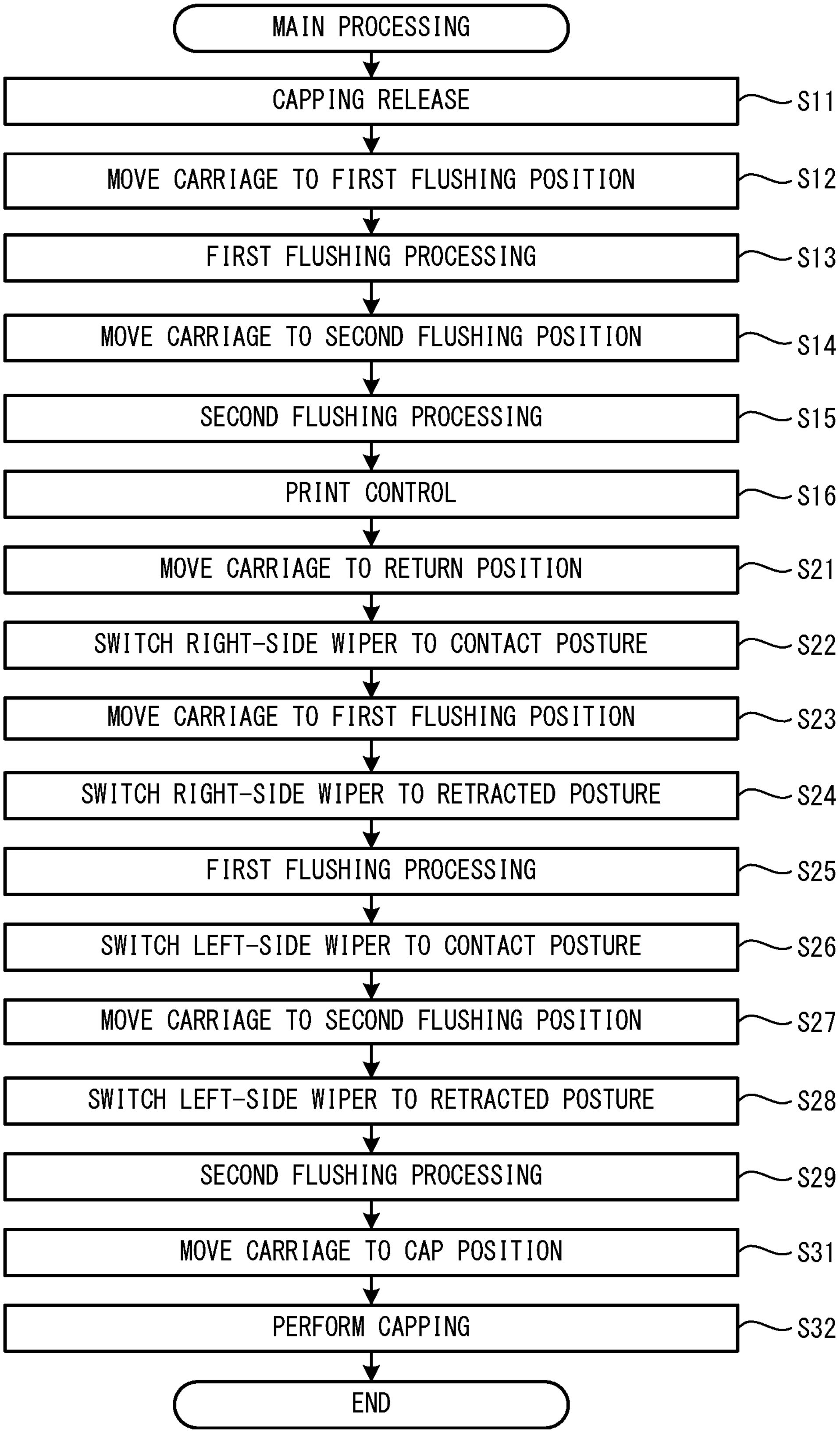
FIG. 6 is a flowchart of main processing.

As shown in FIG. 6, when the main processing is started, the CPU 81 controls the cap motor 48 and moves the cap support portion 47 shown in FIG. 7 downward (step S11). In this way, as shown in FIG. 8, each of the caps 41 to 44 is separated, downward, from the nozzle surfaces 311, 321, 331, and 341. In other words, the capping is released from the capping state shown in FIG. 7, and the uncapping state shown in FIG. 8 is obtained.

Figure 9:
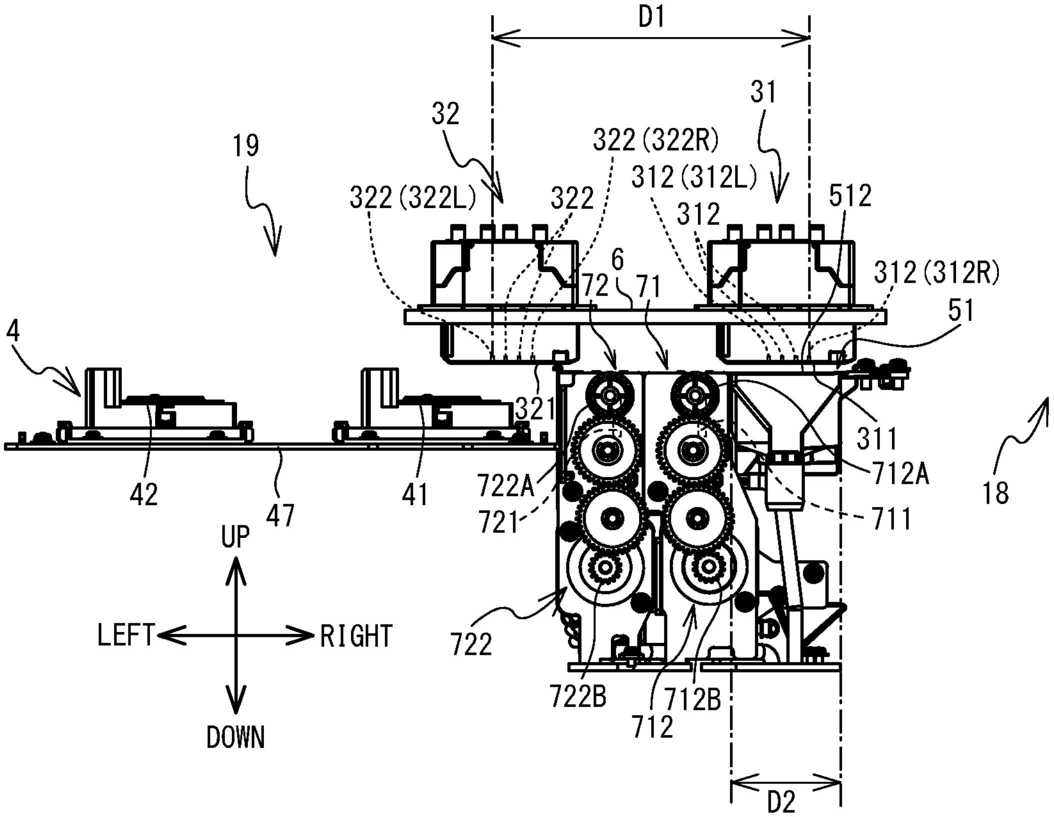
FIG. 9 is a diagram in the direction of arrows along the line A-A shown in FIG. 2 when the carriage is positioned at a first flushing position, and is a diagram showing a case in which the wipers are in the retracted posture.

As shown in FIG. 6, the CPU 81 controls the main scanning motor 99 on the basis of the detection result from the encoder 991, moves the carriage 6 to the right from the cap position shown in FIG. 8, and stops the carriage 6 at the first flushing position shown in FIG. 9 (step S12). As shown in FIG. 9, when the carriage 6 is positioned at the first flushing position, in the white head 31, at least one of the plurality of nozzle rows 312 (in the present embodiment, all the nozzle rows 312) faces the receiver 512 in the up-down direction. When the carriage 6 is positioned at the first flushing position, in the color head 33, at least one of the plurality of nozzle rows 332 (in the present embodiment, all the nozzle rows 332) faces the receiver 522 in the up-down direction (not shown in the drawings).

In the left-right direction, the width D2 of the receiver 512 is smaller than the nozzle row maximum distance D1. Thus, when the carriage 6 is positioned at the first flushing position, at least one of the plurality of nozzle rows 322 (in the present embodiment, all the nozzle rows 322) is positioned further to the left than the receiver 512. In a similar manner, at least one of the plurality of nozzle rows 342 (in the present embodiment, all the nozzle rows 342) is positioned further to the left than the receiver 522 (not shown in the drawings).

As shown in FIG. 6, the CPU 81 performs first flushing processing in the state in which the carriage 6 is stopped at the first flushing position shown in FIG. 9 (step S13). In the first flushing processing, the CPU 81 controls the head drivers 301 and 303, causes the discharge flushing operation to be performed with respect to the white head 31 and the color head 33, and also controls the head driver 302 and causes the non-discharge flushing operation to be performed with respect to the white head 32. For example, the CPU 81 outputs a pulse signal having a pulse width T1 shown in FIG. 15, to the head drivers 301 and 303 during a first predetermined time period, and also outputs a pulse signal having a pulse width T2 shown in FIG. 16, to the head driver 302 during a second predetermined time period. The pulse width T1 has a length approximately that over which the ink is discharged from the head 3. The pulse width T2 has a length approximately that over which the ink is not discharged by the head 3, and is shorter than the pulse width T1.

In the present embodiment, the length of the second predetermined time period is the same as the length of the first predetermined time period. The first predetermined time period and the second predetermined time period are stored in the flash memory 84, for example. A timing at which the output of the pulse signal having the pulse width T1 shown in FIG. 15 by the CPU 81 to the head drivers 301 and 303 is started is the same as a timing at which the output of the pulse signal having the pulse width T2 shown in FIG. 16 by the CPU 81 to the head driver 302 is started. Thus, in the present embodiment, the discharge flushing operation by the white head 31 and the color head 33, and the non-discharge flushing operation by the white head 32 are started simultaneously, and end simultaneously after the elapse of the first predetermined time period (the second predetermined time period).

As a result of the discharge flushing operation, the white head 31 discharges the ink from all the plurality of nozzles 313, and the color head 33 discharges the ink from all the plurality of nozzles 333. The carriage 6 is positioned at the first flushing position. Thus, the white ink discharged from the plurality of nozzles 313 by the discharge flushing operation in the white head 31 passes into the receiver 512 and lands on the absorption member 513. The absorption member 513 absorbs the white ink that has landed thereon. The color inks discharged from the plurality of nozzles 333 by the discharge flushing operation in the color head 33 pass into the receiver 522 and land on the absorption member 523. The absorption member 523 absorbs the color inks that have landed thereon.

As a result of the non-discharge flushing operation, in the white head 32, the white ink inside the plurality of nozzles 323 oscillates without being discharged. Thus, in the white head 32, the printer 1 can suppress the white ink from entering into the dry state, without discharging the white ink to the outside of the receiver 512 by the discharge flushing operation. In the first flushing processing, the CPU 81 does not output the pulse signal to the head driver 304. In other words, the CPU 81 does not cause the discharge flushing operation or the non-discharge flushing operation to be performed with respect to the color head 34. Thus, the printer 1 can suppress a drive load of the head driver 304 resulting from the flushing operation.

Figure 10:
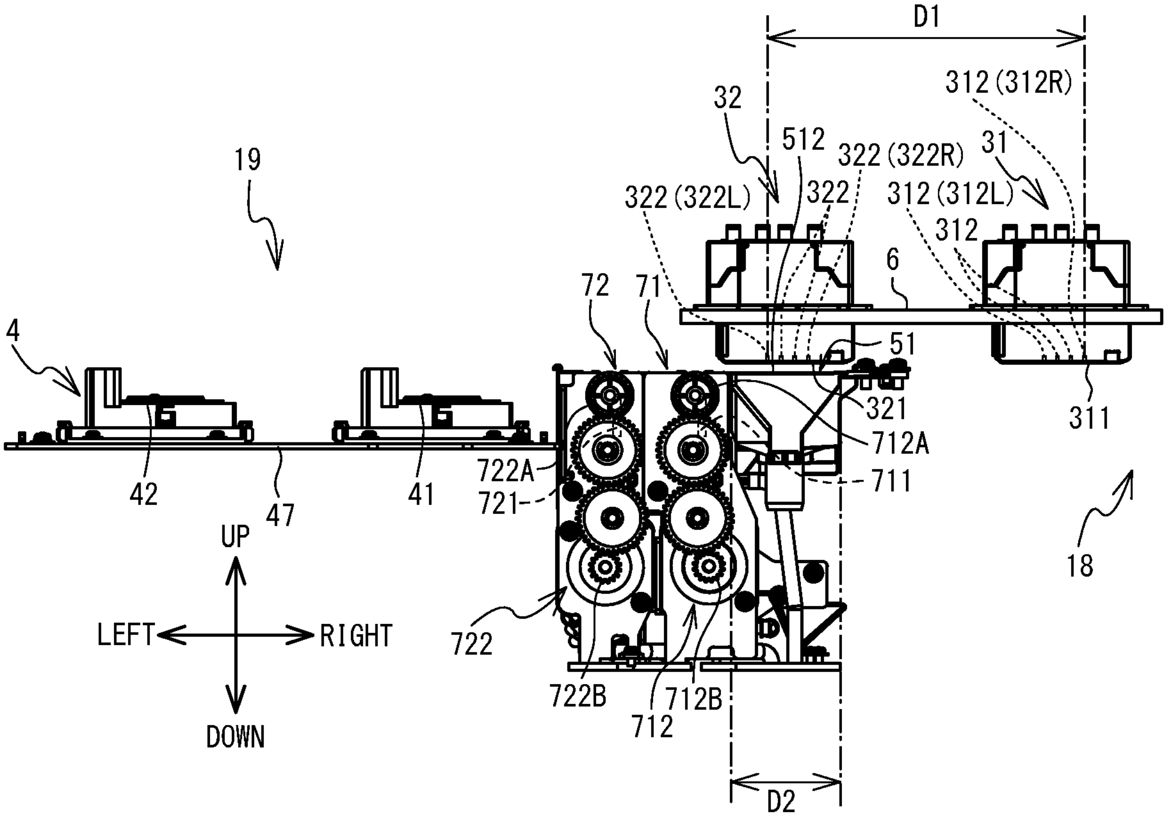
FIG. 10 is a diagram in the direction of arrows along the line A-A shown in FIG. 2 when the carriage is positioned at a second flushing position, and is a diagram showing a case in which the wipers are in the retracted posture.

As shown in FIG. 6, the CPU 81 controls the main scanning motor 99 on the basis of the detection result from the encoder 991, moves the carriage 6 to the right from the first flushing position shown in FIG. 9, and stops the carriage 6 at the second flushing position shown in FIG. 10 (step S14). As shown in FIG. 10, when the carriage 6 is positioned at the second flushing position, in the white head 32, at least one of the plurality of nozzle rows 322 (in the present embodiment, all the nozzle rows 322) faces the receiver 512 in the up-down direction. When the carriage 6 is positioned at the second flushing position, in the color head 34, at least one of the plurality of nozzle rows 342 (in the present embodiment, all the nozzle rows 342) faces the receiver 522 in the up-down direction (not shown in the drawings).

In the left-right direction, the width D2 of the receiver 512 is smaller than the nozzle row maximum distance D1. Thus, when the carriage 6 is positioned at the second flushing position, at least one of the plurality of nozzle rows 312 (in the present embodiment, all the nozzle rows 312) is positioned further to the right than the receiver 512. In a similar manner, at least one of the plurality of nozzle rows 332 (in the present embodiment, all the nozzle rows 332) is positioned further to the right than the receiver 522 (not shown in the drawings).

As shown in FIG. 6, the CPU 81 performs second flushing processing in the state in which the carriage 6 is stopped at the second flushing position shown in FIG. 10 (step S15). In the second flushing processing, the CPU 81 controls the head drivers 302 and 304, causes the discharge flushing operation to be performed with respect to the white head 32 and the color head 34, and also controls the head driver 301 and causes the non-discharge flushing operation to be performed with respect to the white head 31.

Figure 15:
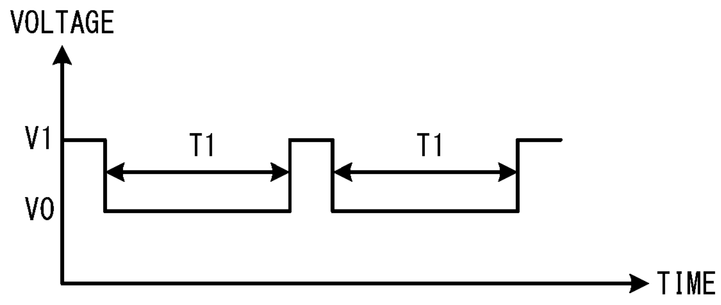
FIG. 15 is a waveform diagram of a pulse signal output from a CPU when a discharge flushing operation is performed.
Figure 16:
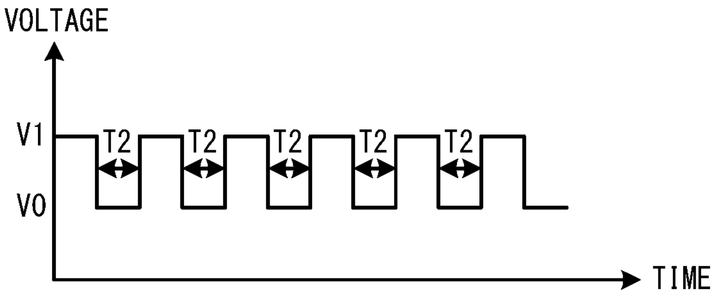
FIG. 16 is a waveform diagram of a pulse signal output from the CPU when a non-discharge flushing operation is performed.

For example, the CPU 81 outputs a pulse signal having the pulse width T1 shown in FIG. 15, to the head drivers 302 and 304 during the first predetermined time period, and also outputs a pulse signal having the pulse width T2 shown in FIG. 16, to the head driver 301 during the second predetermined time period. In a similar manner to the first flushing processing, in the present embodiment, the discharge flushing operation by the white head 32 and the color head 34 and the non-discharge flushing operation by the white head 31 are started simultaneously, and end simultaneously after the elapse of the first predetermined time period (the second predetermined time period).

As a result of the discharge flushing operation, the white head 32 discharges the ink from all the plurality of nozzles 323, and the color head 34 discharges the ink from all the plurality of nozzles 343. The carriage 6 is positioned at the second flushing position. Thus, the white ink discharged from the plurality of nozzles 323 by the discharge flushing operation in the white head 32 passes into the receiver 512 and lands on the absorption member 513. The absorption member 513 absorbs the white ink that has landed thereon. The color inks discharged from the plurality of nozzles 343 by the discharge flushing operation in the color head 34 pass into the receiver 522 and land on the absorption member 523. The absorption member 523 absorbs the color inks that have landed thereon.

As a result of the non-discharge flushing operation, in the white head 31, the ink inside the plurality of nozzles 313 oscillates without being discharged. Thus, in the white head 31, the printer 1 can suppress the white ink in the plurality of nozzles 313 from entering into the dry state, without discharging the white ink to the outside of the receiver 512 by the discharge flushing operation.

In the second flushing processing, the CPU 81 does not output the pulse signal to the head driver 303. In other words, the CPU 81 does not cause the discharge flushing operation or the non-discharge flushing operation to be performed with respect to the color head 33. Thus, the printer 1 can suppress a drive load of the head driver 303 resulting from the flushing operation.

As shown in FIG. 6, the CPU 81 performs print control on the basis of the print data (step S16). In the print control, the CPU 81 controls the sub-scanning motor 97 on the basis of the detection result from the encoder 971, and moves the platen 12 shown in FIG. 2 rearward, to the printing region shown in FIG. 2. The CPU 81 controls the main scanning motor 99 on the basis of the detection result from the encoder 991, and moves the carriage 6 from the second flushing position shown in FIG. 10 to the right, to the printing region shown in FIG. 2 and FIG. 10. In a state in which the platen 12 and the carriage 6 are positioned at the printing region 18, the CPU 81 controls the head drivers 301 to 304, the main scanning motor 99 and the sub-scanning motor 97. In this way, by repeating the discharge scanning and the movement of the platen 12 in the front-rear direction, the CPU 81 controls the printing on the print medium. When the printing on the basis of the print data ends, the CPU 81 ends the print control.

Figure 11:
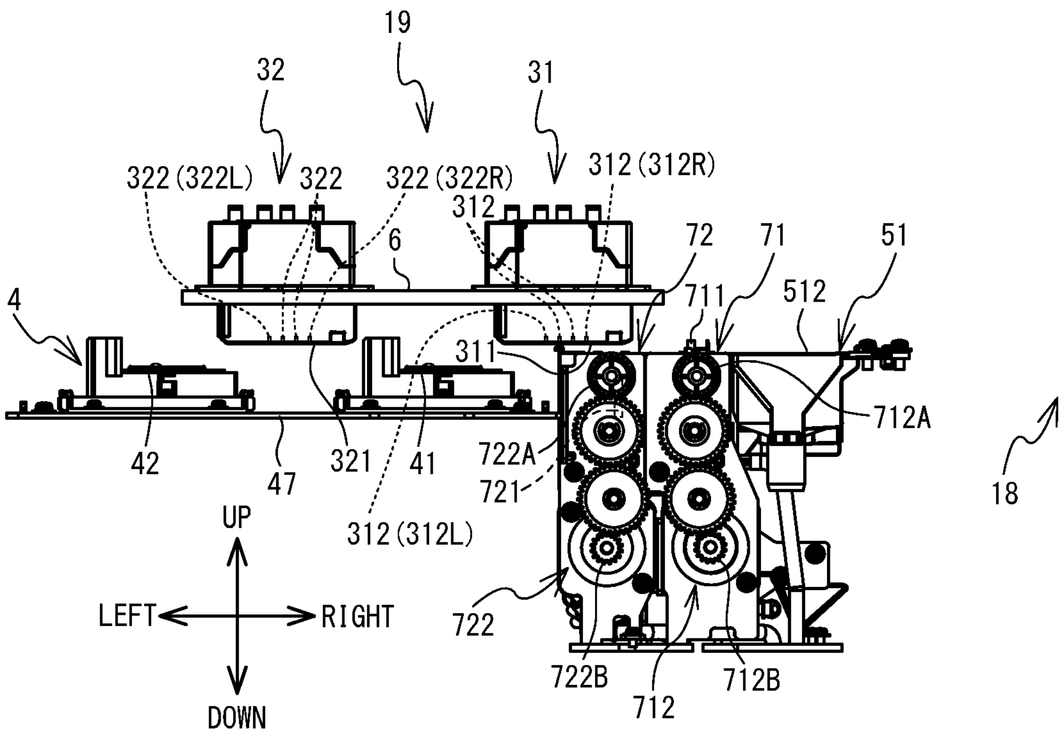
FIG. 11 is a diagram in the direction of arrows along the line A-A shown in FIG. 2 when the carriage is positioned at a return position, and is a diagram showing a case in which the wiper is in a contact posture and the wiper is in the retracted posture.

As shown in FIG. 6, the CPU 81 controls the main scanning motor 99 on the basis of the detection result from the encoder 991, moves the carriage 6 to the left from the printing region 18 shown in FIG. 2 and FIG. 10, and stops the carriage 6 at a return position shown in FIG. 11 (step S21). As shown in FIG. 11, the return position is a position, in the left-right direction, between the cap position shown in FIG. 8 and the first flushing position shown in FIG. 9. When the carriage 6 is positioned at the return position, the right end of the white head 31 is positioned further to the left than the wiper 711. When the carriage 6 is positioned at the return position, the right end of the color head 33 is positioned further to the left than the wiper 731 (not shown in the drawings).

As shown in FIG. 6, the CPU 81 controls the wiper motor 76 and switches the wipers 711 and 731 from the retracted posture shown in FIG. 10 to the contact posture shown in FIG. 11 (step S22). The CPU 81 controls the main scanning motor 99 on the basis of the detection result from the encoder 991, moves the carriage 6 to the right from the return position shown in FIG. 11, and stops the carriage 6 at the first flushing position shown in FIG. 12 (step S23). The wipers 711 and 731 are in the contact posture, and thus, during the movement of the carriage 6, the wipers 711 and 731 come into contact with the nozzle surfaces 311 and 331, respectively. In this way, the wipers 711 and 731 respectively wipe away the ink that has adhered to the nozzle surfaces 311 and 331 in the print control (step S16).

Figure 13:
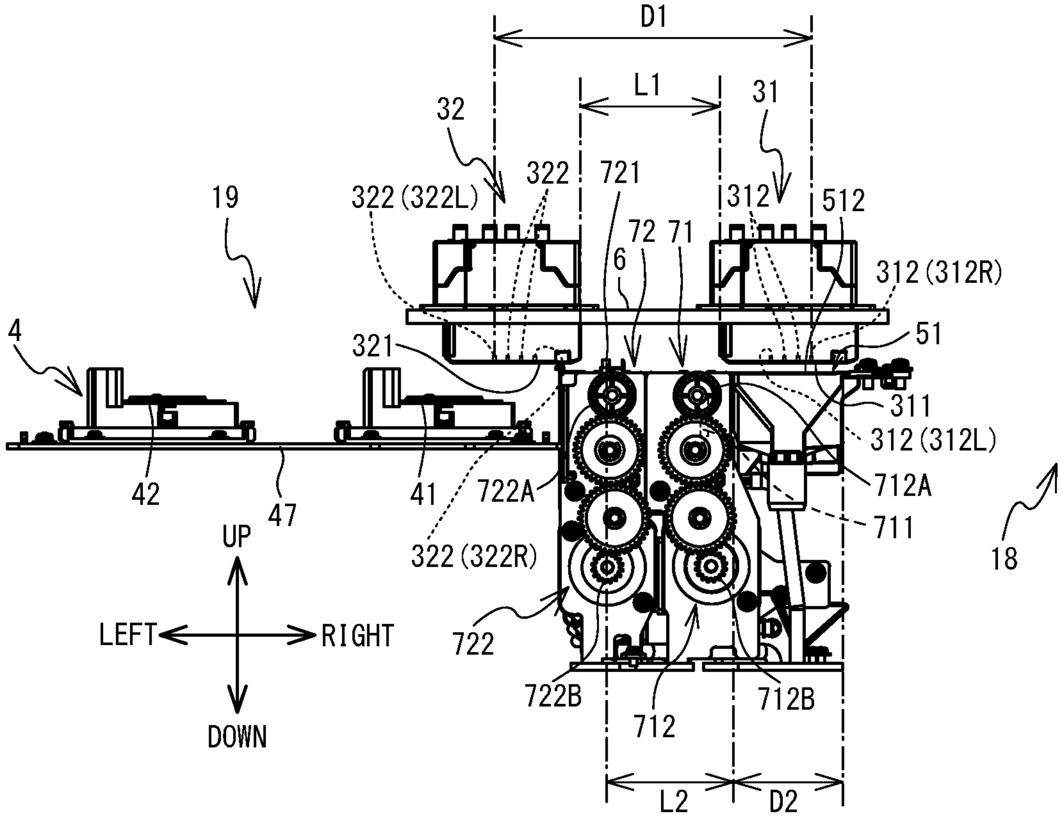
FIG. 13 is a diagram in the direction of arrows along the line A-A shown in FIG. 2 when the carriage is positioned at the first flushing position, and is a diagram showing a case in which the wiper is in the retracted posture and the wiper is in the contact posture.

As shown in FIG. 13, in the left-right direction, the interval L2 between the wiper 721 and the flushing box 51 is smaller than the interval L1 between the white head 31 and the white head 32. Thus, when the carriage 6 is positioned at the first flushing position, the right end of the white head 32 is positioned further to the left than the wiper 721. In a similar manner, when the carriage 6 is positioned at the first flushing position, the right end of the color head 34 is positioned further to the left than the wiper 741 (not shown in the drawings).

Figure 12:
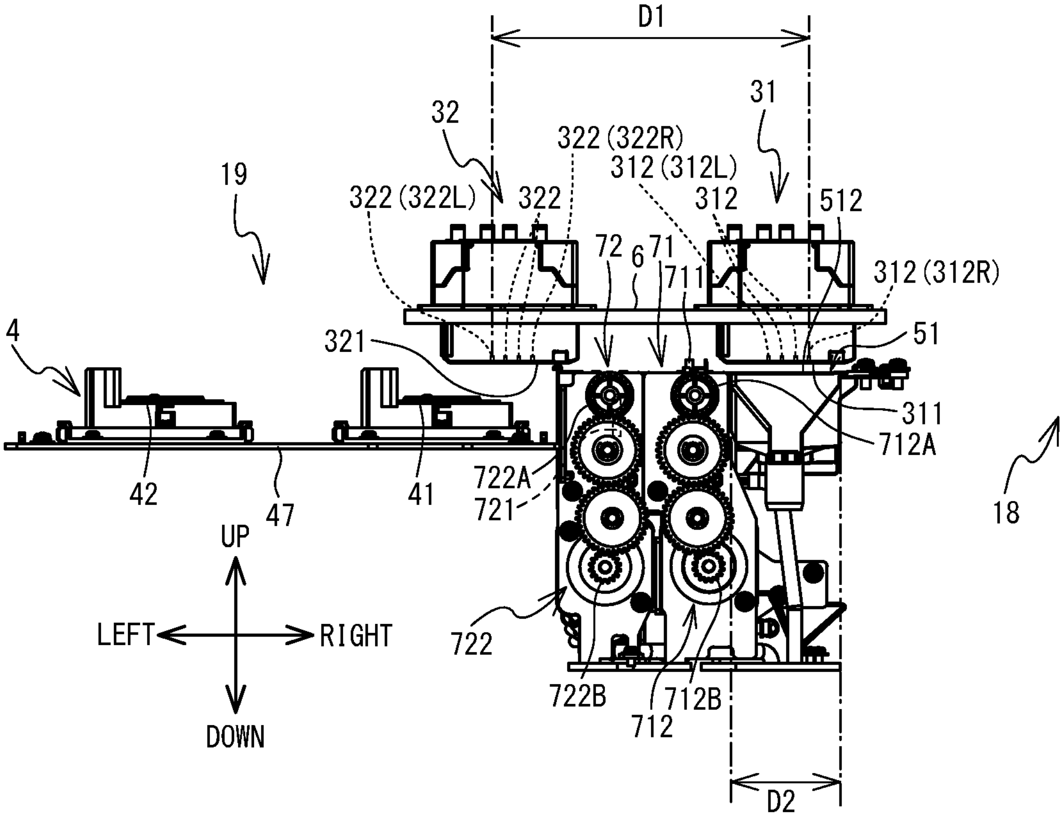
FIG. 12 is a diagram in the direction of arrows along the line A-A shown in FIG. 2 when the carriage is positioned at the first flushing position, and is a diagram showing a case in which the wiper is in the contact posture and the wiper is in the retracted posture.

As shown in FIG. 6, the CPU 81 controls the wiper motor 76 and switches the wipers 711 and 731 from the contact posture shown in FIG. 12 to the retracted posture shown in FIG. 13 (step S24). The CPU 81 performs the first flushing processing in the state in which the carriage 6 is stopped at the first flushing position shown in FIG. 13 (step S25). The first flushing processing at step S25 is the same as the first flushing processing at step S13.

The CPU 81 controls the wiper motor 77 and switches the wipers 721 and 741 from the retracted posture shown in FIG. 12 to the contact posture shown in FIG. 13 (step S26). The CPU 81 controls the main scanning motor 99 on the basis of the detection result from the encoder 991, moves the carriage 6 to the right from the first flushing position shown in FIG. 13, and stops the carriage 6 at the second flushing position shown in FIG. 14 (step S27). The wipers 721 and 741 are in the contact posture, and thus, during the movement of the carriage 6, the wipers 721 and 741 come into contact with the nozzle surfaces 321 and 341, respectively. In this way, the wipers 721 and 741 respectively wipe away the ink that has adhered to the nozzle surfaces 321 and 341 in the print control (step S16).

Figure 14:
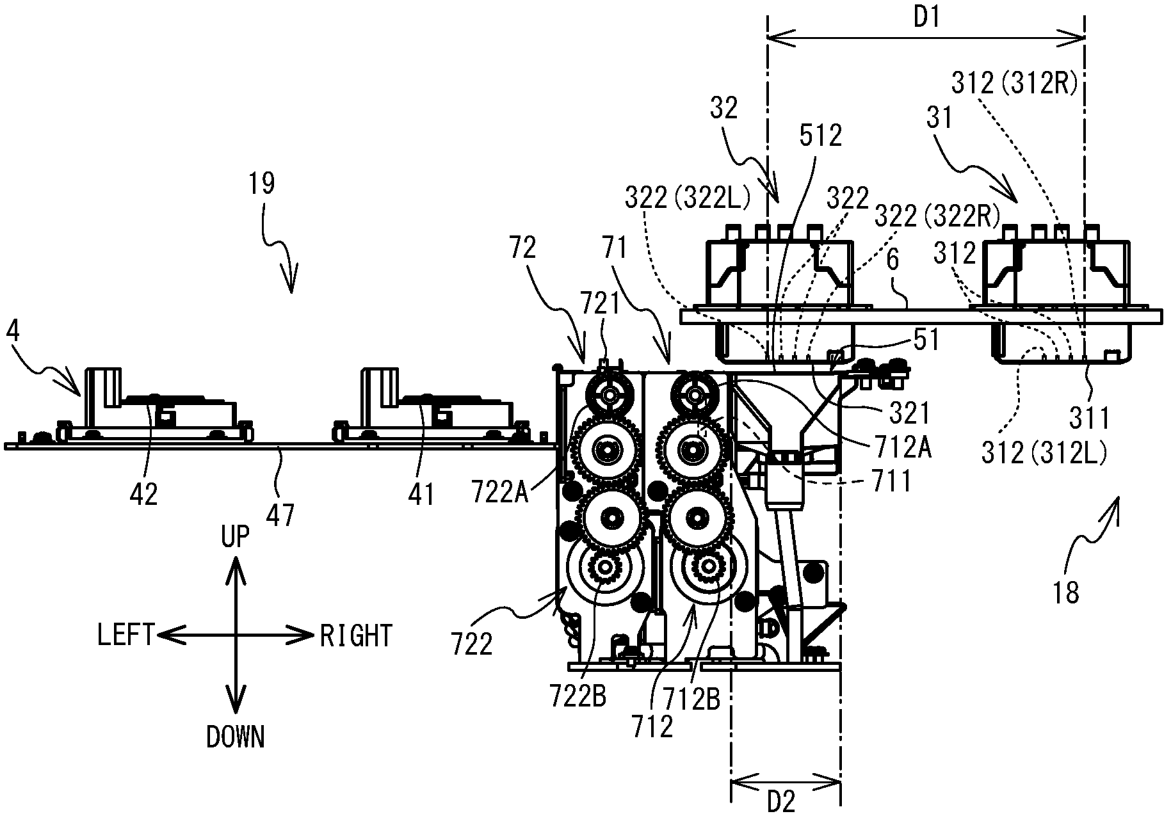
FIG. 14 is a diagram in the direction of arrows along the line A-A shown in FIG. 2 when the carriage is positioned at the second flushing position, and is a diagram showing a case in which the wiper is in the retracted posture and the wiper is in the contact posture.

The CPU 81 controls the wiper motor 77 and switches the wipers 721 and 741 from the contact posture shown in FIG. 14 to the retracted posture shown in FIG. 8 (step S28). The CPU 81 performs the second flushing processing (step S29). The second flushing processing at step S29 is the same as the second flushing processing at step S15.

The CPU 81 controls the main scanning motor 99 on the basis of the detection result from the encoder 991, moves the carriage 6 to the left from the second flushing position shown in FIG. 14, and stops the carriage 6 at the cap position shown in FIG. 8 (step S31). The CPU 81 controls the cap motor 48 and moves the cap support portion 47 upward (step S32). In this way, the caps 41 to 44 adhere closely, from below, to the nozzle surfaces 311, 321, 331, and 341, respectively. In other words, the caps 41 to 44 are caused to perform the capping, from the uncapping state shown in FIG. 8 to the capping state shown in FIG. 7. The CPU 81 ends the main processing.

An example will be described of the operations and effects according to the embodiment described above. Hereinafter, the ink discharged from the head 3 by the discharge flushing operation is referred to as "discharge flushing ink." For example, it is conceivable that the discharge flushing operation is performed simultaneously by all the plurality of heads 3 in the state in which the platen 12 is positioned at the cap position. In this case, the discharge flushing ink lands in the caps 41 to 44. In general, in order to increase a negative pressure raising efficiency at the time of purging, to increase humidity inside the caps 41 to 44, and the like, the capacity of the caps 41 to 44 is smaller than the capacity of the recessed portions 511 and 521 in the flushing boxes 51 and 52, for example. Thus, when the ink is caused to be discharged toward the inside of the caps 41 to 44 from all the plurality of heads 3 by the discharge flushing operation, there is a possibility that an amount of the discharge flushing ink is restricted.

In order to suppress the amount of discharge flushing ink from being restricted, the printer 1 is provided with the flushing boxes 51 and 52. In other words, in the printer 1, the ink is discharged toward the flushing boxes 51 and 52 from the heads 3 by the discharge flushing operation. For example, it is conceivable that, in the left-right direction, the flushing boxes 51 and 52 may be configured such that the width D2 of the receiver 512 may be greater than the nozzle row maximum distance D1.

In this case, all the nozzle rows 312 and 322 can simultaneously face the receiver 512 in the up-down direction, and all the nozzle rows 332 and 342 can simultaneously face the receiver 522. Thus, the white heads 31 and 32 can perform the discharge flushing operation simultaneously, and the color heads 33 and 34 can perform the discharge flushing operation simultaneously. On the other hand, in this case, the flushing boxes 51 and 52 increase in size in the left-right direction, and there is a possibility that the printer 1 as a whole may increase in size in the left-right direction. In the above-described embodiment, in the left-right direction, the width D2 of the receiver 512 is smaller than the nozzle row maximum distance D1. Thus, the printer 1 can suppress the flushing boxes 51 and 52 from increasing in size in the left-right direction. As a result, the printer 1 can inhibit the amount of the discharge flushing ink from being restricted while suppressing the increase in size, in the left-right direction, of the printer 1 as a whole.

The printer 1 is provided with the nozzle surfaces 311, 321, 331, and 341, the flushing box 51, the head drivers 301, 302, 303, and 304, and the CPU 81. The nozzle rows 312 are provided at the nozzle surface 311. The nozzle rows 312 are configured by the plurality of nozzles 313 aligned in the front-rear direction. The nozzle rows 322 are provided at the nozzle surface 321. The nozzle rows 322 are configured by the plurality of nozzles 323 aligned in the front-rear direction. The nozzle rows 332 are provided at the nozzle surface 331. The nozzle rows 332 are configured by the plurality of nozzles 333 aligned in the front-rear direction. The nozzle rows 342 are provided at the nozzle surface 341. The nozzle rows 342 are configured by the plurality of nozzles 343 aligned in the front-rear direction. The nozzle rows 322 and 342 are disposed to the left of the nozzle rows 312 and 332. The nozzles 313, 323, 333, and 343 discharge the ink downward. The flushing boxes 51 and 52 move in the left-right direction relative to the nozzle surfaces 311, 321, 331, and 341. The receivers 512 and 522 are provided at the flushing boxes 51 and 52. The receivers 512 and 522 have the width D2 in the left-right direction. In the left-right direction, the width D2 of the receiver 512 is smaller than the nozzle row maximum distance D1. In the left-right direction, the width D2 of the receiver 522 is smaller than the nozzle row maximum distance D1. The head drivers 301, 302, 303, and 304 perform the discharge flushing operation and the non-discharge flushing operation. The CPU 81 performs the first flushing processing (step S13, step S25) in the state in which the nozzle rows 312 and 332 are caused to face the receivers 512 and 522 in the up-down direction. In the first flushing processing, the CPU 81 causes the head driver 301 to perform the discharge flushing operation in all the plurality of nozzles 313, causes the head driver 303 to perform the discharge flushing operation in all the plurality of nozzles 333, and causes the head driver 302 to perform the non-discharge flushing operation in all the plurality of nozzles 323.

According to this processing, during the first flushing processing, the discharge flushing operation is performed by the head drivers 301 and 303 in the plurality of nozzles 313 and 333. In this way, the printer 1 can suppress the ink discharge failure in the plurality of nozzles 313 and 333. In addition, during the first flushing processing, the non-discharge flushing operation is performed by the head driver 302 in the plurality of nozzles 323. In this way, the printer 1 can suppress the ink inside the plurality of nozzles 323 from being in the dry state. As a result, the printer 1 can suppress the ink discharge failure in the plurality of nozzles 323. Thus, the printer 1 can suppress the ink discharge failure by the plurality of nozzles 313, 323, and 333.

The CPU 81 performs the second flushing processing (step S15, step S29) in the state in which the nozzle rows 322 and 342 are caused to face the receivers 512 and 522 in the up-down direction. In the second flushing processing, the CPU 81 causes the head driver 302 to perform the discharge flushing operation in all the plurality of nozzles 323, causes the head driver 304 to perform the discharge flushing operation in all the plurality of nozzles 343, and causes the head driver 303 to perform the non-discharge flushing operation in all the plurality of nozzles 313.

According to this processing, during the second flushing processing, the discharge flushing operation is performed by the head drivers 302 and 304 in the plurality of nozzles 323 and 343. In this way, the printer 1 can suppress the ink discharge failure in the plurality of nozzles 323 and 343. In addition, during the second flushing processing, the non-discharge flushing operation is performed by the head driver 303 in the plurality of nozzles 313. In this way, the printer 1 can suppress the ink inside the plurality of nozzles 313 from being in the dry state. As a result, the printer 1 can suppress the ink discharge failure in the plurality of nozzles 313. Thus, the printer 1 can suppress the ink discharge failure by the plurality of nozzles 313, 323, 333 and 343.

The printer 1 is provided with the caps 41 to 44. The caps 41 to 44 can move in the left-right direction relative to the nozzle surfaces 311, 321, 331, and 341, and can adhere closely to the nozzle surfaces 311, 321, 331, and 341. The print medium is placed on the platen 12. The CPU 81 performs the print processing (step S16) in the state in which the nozzle rows 312, 322, 332, and 342 are caused to face the platen 12 in the up-down direction. In the print processing, the CPU 81 discharges the ink onto the print medium from the plurality of nozzles 313, 323, 333, and 343. After the print processing, the CPU 81 performs the first flushing processing (step S25) in the state in which the nozzle rows 312 and 332 are caused to face the receivers 512 and 522 in the up-down direction. After the first flushing processing, the CPU 81 performs the second flushing processing (step S29) in the state in which the nozzle rows 322 and 342 are caused to face the receivers 512 and 522 in the up-down direction. After the second flushing processing, in the capping processing (step S32), the CPU 81 causes the caps 41 to 44 to adhere closely to the nozzle surfaces 311, 321, 331, and 341, in the state in which the nozzle rows 312, 322, 332, and 342 are caused to face the caps 41 to 44 in the up-down direction.

In this way, in the print processing, there is a possibility that the ink inside the nozzles 313, 323, 333, and 343 may be in the dry state as a result of being exposed to the atmosphere. The first flushing processing and the second flushing processing are performed after the print processing, and before the capping processing. Thus, the printer 1 can suppress the ink discharge failure by the plurality of nozzles 313, 323, 333, and 343 in the processing after the capping processing. For example, after the capping processing, there is a case in which, in the capping state, a purge operation is performed in order to remove impurities in the air or the like inside the nozzles 313, 323, 333, and 343. For example, the CPU 81 performs the purge operation by driving a pump (not shown in the drawings) and causing a negative pressure inside the caps 41 to 44, thus sucking the ink from inside the nozzles 313, 323, 333, and 343. In this case, the purge operation is performed in the state in which the ink discharge failure by the plurality of nozzles 313, 323, 333, and 343 is suppressed. Thus, the printer 1 can perform the purge operation in a more favorable state than when the first flushing processing and the second flushing processing are not performed before the purge operation.

The printer 1 is provided with the wipers 711, 721, 731 and 741. The wipers 711, 721, 731 and 741 are positioned between the flushing boxes 51 and 52 and the caps 41 to 44 in the left-right direction. The wipers 711, 721, 731 and 741 can move in the left-right direction relative to the nozzle surfaces 311, 321, 331, and 341, respectively, and can come into contact with the nozzle surfaces 311, 321, 331, and 341. The nozzle rows 322 and 342 are positioned to the left of the nozzle rows 312 and 332, in the left-right direction. To the left is the direction from the flushing boxes 51 and 52 toward the caps 41 to 44. The CPU 81 performs the print processing (step S16). After the print processing, in first movement processing (step S21), the CPU 81 moves the nozzle surfaces 311, 321, 331, and 341 in the left-right direction relative to the wipers 711, 721, 731 and 741, and positions the nozzle rows 312, 322, 332, and 342 further to the left than the wipers 711, 721, 731 and 741. After the first movement processing, the CPU 81 performs first wiping processing (step S23) in the state in which the wipers 711 and 731 can come into contact with the nozzle surfaces 311 and 331. In the first wiping processing, the CPU 81 moves the nozzle surfaces 311, 321, 331, and 341 to the right relative to the wipers 711, 721, 731 and 741, and causes the nozzle rows 312 and 332 to face the receivers 512 and 522 in the up-down direction. After the first wiping processing, the CPU 81 performs the first flushing processing (step S25). After the first flushing processing, the CPU 81 performs second wiping processing (step S27) in a state in which the wipers 721 and 741 can come into contact with the nozzle surfaces 321 and 344. In the second wiping processing, the CPU 81 moves the nozzle surfaces 311, 321, 331, and 341 to the right relative to the wipers 711, 721, 731 and 741, and causes the nozzle rows 322 and 342 to face the receivers 512 and 522 in the up-down direction. After the second wiping processing, the CPU 81 performs the second flushing processing (step S29). After the second flushing processing, in second movement processing (step S31), the CPU 81 moves the nozzle surfaces 311, 321, 331, and 341 to the left relative to the caps 41 to 44 and causes the nozzle rows 312, 322, 332, and 342 to face the caps 41 to 44 in the up-down direction. After the second movement processing, the CPU 81 performs the capping processing (step S32).

In this way, when the first wiping processing, the first flushing processing, the second wiping processing, and the second flushing processing are performed in the order of the first wiping processing, the first flushing processing, the second wiping processing, and the second flushing processing, the nozzle surfaces 311, 321, 331, and 341 move to the right relative to the flushing boxes 51 and 52 and the wipers 711, 721, 731 and 741. Thus, in comparison to a case in which the nozzle surfaces 311, 321, 331, and 341 move in a reciprocating manner in the left-right direction relative to the flushing boxes 51 and 52 and the wipers 711, 721, 731 and 741, as a result of the first wiping processing, the first flushing processing, the second wiping processing, and the second flushing processing, the printer 1 can shorten a relative movement distance in the left-right direction of the nozzle surfaces 311, 321, 331, and 341 with respect to the flushing boxes 51 and 52 and the wipers 711, 721, 731 and 741.

The printer 1 is provided with the caps 41 to 44. In the left-right direction, the caps 41 to 44 are positioned opposite to the platen 12 with respect to the flushing boxes 51 and 52. The caps 41 to 44 can move in the left-right direction relative to the nozzle surfaces 311, 321, 331, and 341 and can adhere closely to the nozzle surfaces 311, 321, 331, and 341. The nozzle rows 322 and 342 are positioned to the left with respect to the nozzle rows 312 and 332. To the left is the direction from the flushing boxes 51 and 52 toward the caps 41 to 44. In capping release processing (step S11), the CPU 81 releases the capping state by the caps 41 to 44. After the capping release processing, the CPU 81 performs the first flushing processing (step S13) in the state in which the nozzle rows 312 and 332 are caused to face the receivers 512 and 522 in the up-down direction, and after the first flushing processing, the CPU 81 performs the second flushing processing (step S15) in the state in which the nozzle rows 322 and 342 are caused to face the receivers 512 and 522 in the up-down direction. After the second flushing processing, the CPU 81 performs the print processing (step S16) in the state in which the nozzle rows 312, 322, 332, and 342 are caused to face the platen 12 in the up-down direction. In the print processing, the CPU 81 discharges the ink onto the print medium from the plurality of nozzles 313, 323, 333, and 343.

In this way, in the left-right direction, the caps 41 to 44 are positioned opposite to the platen 12 with respect to the flushing boxes 51 and 52. The nozzle rows 322 and 342 are positioned to the left of the nozzle rows 312 and 332. To the left is the direction from the flushing boxes 51 and 52 toward the caps 41 to 44. Thus, when the capping release processing, the first flushing processing, the second flushing processing, and the print processing are performed in the order of the capping release processing, the first flushing processing, the second flushing processing, and the print processing, the nozzle surfaces 311, 321, 331, and 341 move to the right relative to flushing boxes 51 and 52. Thus, in comparison to a case in which the nozzle surfaces 311, 321, 331, and 341 move in the reciprocating manner in the left-right direction relative to the flushing boxes 51 and 52 and the wipers 711, 721, 731 and 741, as a result of the capping release processing, the first flushing processing, the second flushing processing, and the print processing, the printer 1 can shorten the relative movement distance in the left-right direction of the nozzle surfaces 311, 321, 331, and 341 with respect to the flushing boxes 51 and 52.

In the first flushing processing, during the first predetermined time period, the CPU 81 causes the head drivers 301 and 303 to perform the discharge flushing operation in the plurality of nozzles 313 and 333. In the first flushing processing, during the second predetermined time period from the start of the discharge flushing operation in the plurality of nozzles 313 and 333, the CPU 81 causes the head driver 302 to perform the non-discharge flushing operation in the plurality of nozzles 323. The length of the second predetermined time period is the same as the length of the first predetermined time period.

In this way, the printer 1 can suppress a time period from occurring, before starting and after ending the discharge flushing operation in the plurality of nozzles 313 and 333, in which the non-discharge flushing operation in the nozzles 323 is not performed by the head driver 302. The printer 1 can suppress a time period from occurring, before starting and after ending the non-discharge flushing operation in the nozzles 323, in which the discharge flushing operation in the nozzles 313 and 333 is not performed by the head drivers 301 and 303. As a result, the printer 1 can suppress the ink inside the plurality of nozzles 313 and 333 from being in the dry state and can suppress the ink inside the plurality of nozzles 323 from being in the dry state. Thus, the printer 1 can suppress the ink discharge failure by the plurality of nozzles 313, 323, and 333.

The nozzle surfaces 331 and 341 discharge the color inks from the plurality of nozzles 333 and 343. The nozzle surfaces 311 and 321 discharge the white ink from the plurality of nozzles 313 and 323. The fluidity of the color inks is less likely to deteriorate than the fluidity of the white ink. The CPU 81 performs the first flushing processing in the state in which the nozzle rows 312 and 332 are caused to face the receivers 512 and 522 in the up-down direction. The CPU 81 performs the second flushing processing in the state in which the nozzle rows 322 and 342 are caused to face the receivers 512 and 522 in the up-down direction. In the second flushing processing, the CPU 81 causes the head drivers 302 and 304 to perform the discharge flushing operation in the plurality of nozzles 323 and 343, and does not cause the head driver 303 to perform either the discharge flushing operation or the non-discharge flushing operation in all the plurality of nozzles 333.

In this way, the nozzle surface 331 discharges, from the plurality of nozzles 333, the ink whose fluidity is less likely to deteriorate than the ink discharged from the plurality of nozzles 313 by the nozzle surface 311. Thus, in the second flushing processing, even if neither the discharge flushing operation nor the non-discharge flushing operation are performed by the head driver 303 in all the plurality of nozzles 333, the ink discharge failure by the plurality of nozzles 333 is unlikely to occur. When the discharge failure by the plurality of nozzles 333 is not likely to occur, by not causing the head driver 303 to perform either the discharge flushing operation or the non-discharge flushing operation in the plurality of nozzles 333, the printer 1 can suppress a load on the plurality of nozzles 333 resulting from the discharge flushing operation and the non-discharge flushing operation. The printer 1 can suppress the load on the head driver 303. In a similar manner, in the first flushing processing, the CPU 81 does not cause the head driver 304 to perform either the discharge flushing operation or the non-discharge flushing operation in all the plurality of nozzles 343. Thus, the printer 1 can suppress a load on the plurality of nozzles 343 resulting from the discharge flushing operation and the non-discharge flushing operation, and can suppress the load on the head driver 304.

The printer 1 is provided with the nozzle surfaces 331 and 341. The nozzle rows 332 are provided at the nozzle surface 331. The nozzle rows 332 discharge the ink whose fluidity is less likely to deteriorate than the ink discharged by the plurality of nozzles 313 and 323. The nozzle rows 332 are configured by the plurality of nozzles 333 aligned in the front-rear direction. The nozzle rows 342 discharge the ink whose fluidity is less likely to deteriorate than the ink discharged by the plurality of nozzles 313 and 323. The nozzle rows 342 are configured by the plurality of nozzles 343 aligned in the front-rear direction. The nozzle rows 342 are positioned to the left of the nozzle rows 332. The CPU 81 performs the first flushing processing in the state in which the nozzle rows 332 are caused to face the receivers 512 and 522 in the up-down direction. In the first flushing processing, the CPU 81 causes the head driver 303 to perform the discharge flushing operation in the plurality of nozzles 333, and does not cause the head driver 304 to perform either the discharge flushing operation or the non-discharge flushing operation in the plurality of nozzles 343.

In this way, the nozzle surfaces 331 and 341 discharge, from the nozzles 333 and 343, the ink whose fluidity is less likely to deteriorate. Thus, in the first flushing processing, even if neither the discharge flushing operation nor the non-discharge flushing operation are performed by the head driver 304 in all the plurality of nozzles 343, the ink discharge failure by the plurality of nozzles 343 is unlikely to occur. When the discharge failure by the plurality of nozzles 343 is not likely to occur, by not causing the head driver 304 to perform either the discharge flushing operation or the non-discharge flushing operation in the plurality of nozzles 343, the printer 1 can suppress a load on the plurality of nozzles 343 resulting from the discharge flushing operation and the non-discharge flushing operation. The printer 1 can suppress the load on the head driver 304. In a similar manner, in the second flushing processing, the CPU 81 does not cause the head driver 303 to perform either the discharge flushing operation or the non-discharge flushing operation in the plurality of nozzles 333. Thus, the printer 1 can suppress the load on the plurality of nozzles 333 resulting from the discharge flushing operation and the non-discharge flushing operation, and can suppress the load on the head driver 303.

Figure 17:
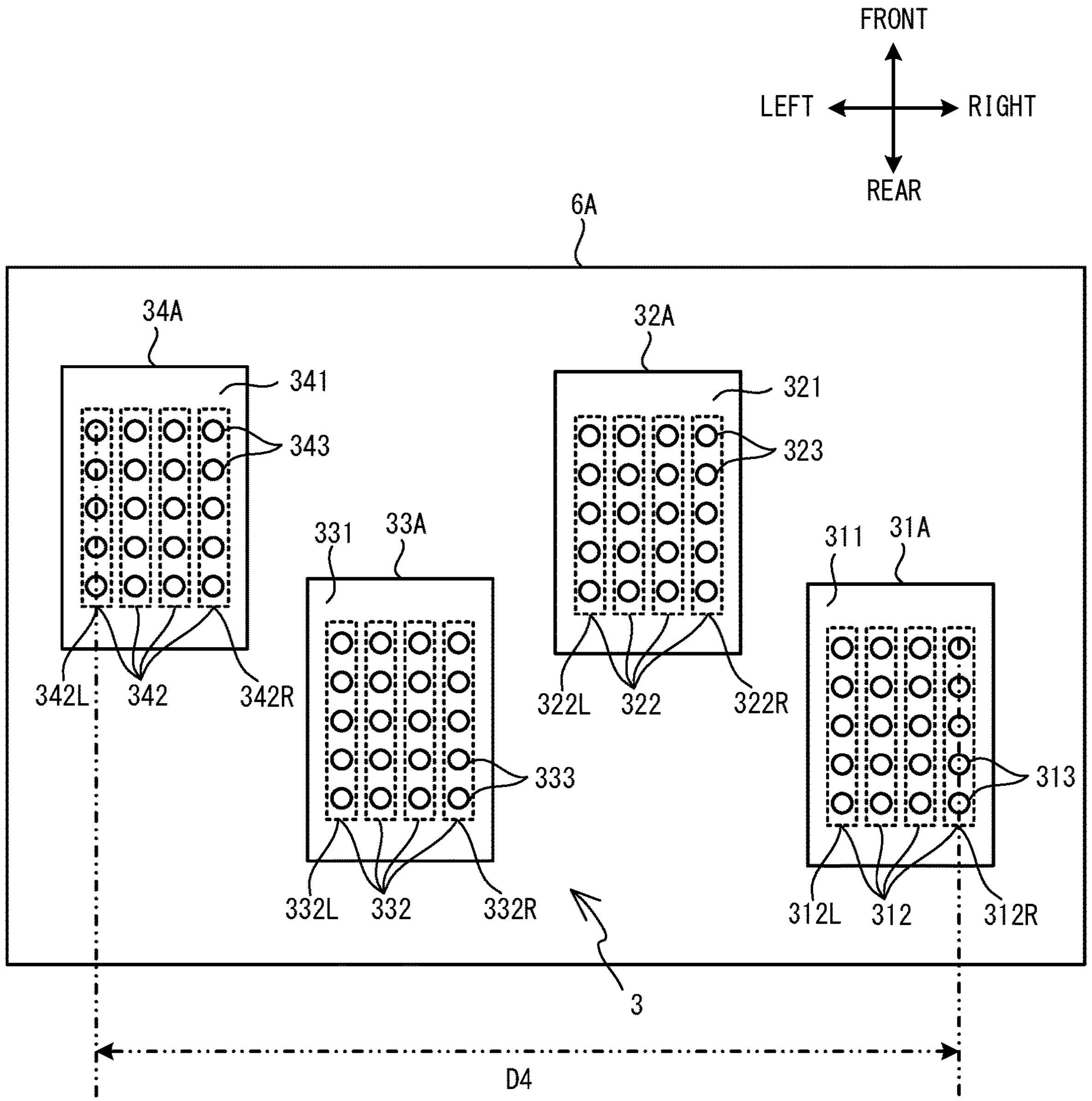
FIG. 17 is a schematic diagram of a carriage as seen from below.

The present disclosure can be changed from the above-described embodiment. Various modified examples, which will be described below, can be combined with one another as long as no contradictions arise. For example, the printer 1 can change arrangement positions of the plurality of heads 3 as appropriate. A modified example of the arrangement positions of the plurality of heads 3 will be described with reference to FIG. 17. Hereinafter, the same reference signs will be allocated to members having equivalent functions as those of the above-described embodiment, and a description thereof will be omitted.

The printer 1 is provided with a carriage 6A in place of the carriage 6 shown in FIG. 3. As the plurality of heads 3, white heads 31A and 32A, and color heads 33A and 34A are provided on the carriage 6A. The white head 31A is positioned at the rear right portion of the carriage 6A, and discharges the white ink from the plurality of nozzles 313. The white head 32A is positioned diagonally to the left and front of the white head 31A, and discharges the white ink from the plurality of nozzles 323.

The color head 33A is positioned further to the left than the white head 32A, and is positioned at the same position as the white head 31A in the front-rear direction. The color head 33A discharges the color inks from the plurality of nozzles 333. The color head 34A is positioned further to the left than the color head 33A, and is positioned at the same position as the white head 32A in the front-rear direction. The color head 34A discharges the color inks from the plurality of nozzles 343. In this case, the printer 1 may be provided with only the flushing box 51, for example, of the flushing boxes 51 and 52. In this case, it is sufficient that the width D2 of the receiver 512 be smaller than a distance D4 between the center, in the left-right direction, of the nozzle row 312R and the center, in the left-right direction, of the nozzle row 342L.

Part of the main processing will be described in the above-described modified example of the arrangement positions of the plurality of heads 3. From after the processing at step S11 to before the processing at step S16, or from after the processing at step S16 to before the processing at step S32, the CPU 81 moves the carriage 6A to a position at which the plurality of nozzle rows 312 in the white head 31A face the receiver 512 in the up-down direction. In the state in which the plurality of nozzle rows 312 of the white head 31A face the receiver 512 in the up-down direction, the CPU 81 causes the discharge flushing operation to be performed in the white head 31A, causes the non-discharge flushing operation to be performed in the white head 32A, and does not cause either the discharge flushing operation or the non-discharge flushing operation to be performed in the color heads 33A and 34A. Note that the CPU 81 may cause the non-discharge flushing operation to be performed in the color heads 33A and 34A.

From after the processing at step S11 to before the processing at step S16, or from after the processing at step S16 to before the processing at step S32, the CPU 81 moves the carriage 6A to a position at which the plurality of nozzle rows 322 in the white head 32A face the receiver 512 in the up-down direction. In the state in which the plurality of nozzle rows 322 of the white head 32A face the receiver 512 in the up-down direction, the CPU 81 causes the discharge flushing operation to be performed in the white head 32A, causes the non-discharge flushing operation to be performed in the white head 31A, and does not cause either the discharge flushing operation or the non-discharge flushing operation to be performed in the color heads 33A and 34A. Note that the CPU 81 may cause the non-discharge flushing operation to be performed in the color heads 33A and 34A.

From after the processing at step S1*l* to before the processing at step S16, or from after the processing at step S16 to before the processing at step S32, the CPU 81 moves the carriage 6A to a position at which the plurality of nozzle rows 332 in the color head 33A face the receiver 512 in the up-down direction. In the state in which the plurality of nozzle rows 332 of the color head 33A face the receiver 512 in the up-down direction, the CPU 81 causes the discharge flushing operation to be performed in the color head 33A, causes the non-discharge flushing operation to be performed in the white heads 31A and 32A, and does not cause either the discharge flushing operation or the non-discharge flushing operation to be performed in the color head 34A. Note that the CPU 81 may cause the non-discharge flushing operation to be performed in the color head 34A. The CPU 81 need not necessarily cause the non-discharge flushing operation to be performed in one or both of the white heads 31A and 32A.

From after the processing at step S1*l* to before the processing at step S16, or from after the processing at step S16 to before the processing at step S32, the CPU 81 moves the carriage 6A to a position at which the plurality of nozzle rows 342 in the color head 34A face the receiver 512 in the up-down direction. In the state in which the plurality of nozzle rows 342 of the color head 34A face the receiver 512 in the up-down direction, the CPU 81 causes the discharge flushing operation to be performed in the color head 34A, causes the non-discharge flushing operation to be performed in the white heads 31A and 32A, and does not cause either the discharge flushing operation or the non-discharge flushing operation to be performed in the color head 33A. Note that the CPU 81 may cause the non-discharge flushing operation to be performed in the color head 33A. The CPU 81 need not necessarily cause the non-discharge flushing operation to be performed in one or both of the white heads 31A and 32A.

Hereinafter, other modified examples will be described. The printer 1 may be provided with five or more of the heads 3. The three or more heads 3 may be aligned in the left-right direction. In this case, the CPU 81 may cause the discharge flushing operation to be performed in each of the heads 3 and cause the non-discharge flushing operation to be performed in the other of the heads 3 in a state in which each of the heads 3 face the receiver 512. The printer 1 may be provided with two or with three of the heads 3, and, for example, one of the white head 31 or the color head 33 may be omitted, or one of the white head 32 or the color head 34 may be omitted. For example, the printer 1 may omit the color heads 33 and 34, and may be provided with the white heads 31 and 32. In this case, the white head 32 is positioned to the left of the white head 31, and partially overlaps with the white head 31 in the left-right direction. Note that the white head 32 need not necessarily overlap with the white head 31 in the left-right direction. For example, the printer 1 may omit the white head 31 and the color head 34, and may be provided with the white head 32 and the color head 33. In this case, the white head 32 is positioned to the left of the color head 33, and is positioned to the rear with respect to the color head 33. In other words, the white head 32 does not overlap with the color head 33 in the left-right direction. Note that the white head 32 may overlap with the color head 33 in the left-right direction. In this case, in the first flushing processing, the CPU 81 may perform the discharge flushing operation in the color head 33 and may perform the non-discharge flushing operation in the white head 32. Furthermore, in the second flushing processing, the CPU 81 may perform the discharge flushing operation in the white head 32 and may not perform either the discharge flushing operation or the non-discharge flushing operation in the color head 33.

Each of the plurality of heads 3 may be provided on a separate carriage. For example, the white heads 31 and 32 may be provided on one carriage, and the color heads 33 and 34 may be provided on another carriage. Some or all of the nozzle surfaces 311, 321, 331, and 341 may be provided on the single head 3. In other words, the number of the heads 3 may be one. For example, the nozzle surface 311 and the nozzle surface 321 may be provided on one of the heads 3, and the nozzle surface 311 and the nozzle surface 331 may be provided on one of the heads 3. A single row of the nozzle rows 312, 322, 332, and 342 may be provided on each of the nozzle surfaces 311, 321, 331, and 341.

In the first flushing processing, the CPU 81 may cause the white head 31 to perform the discharge flushing operation in some of the plurality of nozzles 313, may cause the white head 32 to perform the non-discharge flushing operation in some of the plurality of nozzles 323, may cause the color head 33 to perform the discharge flushing operation in some of the plurality of nozzles 333, and may cause the color head 34 to perform the non-discharge flushing operation in at least one of the plurality of nozzles 343.

In the second flushing processing, the CPU 81 may perform the discharge flushing operation in some of the plurality of nozzles 323 in the white head 32, may perform the non-discharge flushing operation in some of the plurality of nozzles 313 in the white head 31, may perform the discharge flushing operation in some of the plurality of nozzles 343 in the color head 34, and may perform the non-discharge flushing operation in at least one of the plurality of nozzles 333 in the color head 33.

The fluidity of the color inks may be less likely to deteriorate than the fluidity of the white ink, or may be likely to deteriorate to the same extent as the fluidity of the white ink. When the fluidity of the color inks is less likely to deteriorate than the fluidity of the white ink, for example, in the first flushing processing, the CPU 81 may cause the color head 34 to perform the non-discharge flushing operation without causing the white head 32 to perform either the discharge flushing operation or the non-discharge flushing operation. In addition, in the second flushing processing, the CPU 81 may cause the color head 33 to perform the non-discharge flushing operation without causing the white head 31 to perform either the discharge flushing operation or the non-discharge flushing operation.

The second predetermined time period may be longer than the first predetermined time period, or may be shorter than the first predetermined time period. In the first flushing processing or the second flushing processing, the timing at which the discharge flushing operation is started need not necessarily be the same time as the timing at which the non-discharge flushing operation is started. In the first flushing processing or the second flushing processing, the timing at which the discharge flushing operation is ended need not necessarily be the same time as the timing at which the non-discharge flushing operation is ended.

In some or all of the processing at step S12, step S14, step S21, and step S27, the CPU 81 need not necessarily stop the carriage 6. For example, when the carriage 6 is not stopped at step S12 and step S14, the CPU 81 may perform the first flushing processing (step S13) and the second flushing processing (step S15) while moving the first flushing position or the second flushing position with respect to the carriage 6.

At step S21, the CPU 81 may move the carriage 6 to the cap position. Before the print processing, the CPU 81 may perform the first flushing processing (step S13) after performing the second flushing processing (step S15). After the print processing, the CPU 81 may perform the first flushing processing (step S25) after performing the second flushing processing (step S29). The CPU 81 may omit one of the first flushing processing (step S13) or the second flushing processing (step S15). The CPU 81 may omit one of the first flushing processing (step S25) or the second flushing processing (step S29). The first flushing processing (step S13) and the second flushing processing (step S15) are referred to as pre-print flushing processing. The first flushing processing (step S25) and the second flushing processing (step S29) are referred to as post-print flushing processing, and the CPU 81 may omit one of the pre-print flushing processing or the post-print flushing processing. For example, it is preferable that the CPU 81 perform at least the pre-print flushing processing, of the pre-print flushing processing and the post-print flushing processing. Further, the CPU 81 may perform the first flushing processing and the second flushing processing during the printing. In this case, the printer 1 at least suppresses the ink discharge failure during the print control, and is able to suppress worsening of an image quality of a print image.

The printer 1 may be provided with a paper cassette and a conveyance member and may fix a medium support portion at a position lower than the carriage 6 in the printing region 18. A plurality of sheets of paper are set in the paper cassette as the print medium. The conveyance member is a roller, for example. In this case, the printer 1 conveys the sheet of paper from the paper cassette onto the medium support portion by rotating the conveyance member. The printer 1 performs the printing, using the heads 3, on the sheet of paper conveyed onto the medium support portion.

The printer 1 may be provided with a medium holding portion and the conveyance member, and may fix the medium support portion at a position lower than the carriage 6 in the printing region 18. The medium holding portion holds a medium roll or fanfold paper. The medium roll is configured, as the print medium, by sheets of paper connected in a roll shape. The conveyance member is the roller, for example. In this case, the printer 1 pulls out the sheet of paper, which is the print medium, from the medium roll or the fanfold paper, and conveys the sheet of paper onto the medium support portion. The printer 1 performs the printing, using the heads 3, on the sheet of paper conveyed onto the medium support portion.

The movement mechanisms of each of the heads 3 and the platen 12 are not limited to those of the above-described embodiment. For example, the heads 3 and the platen 12 may each be moved by a movement mechanism such as a roller, a ball screw, or the like. The heads 3 may be line heads. It is sufficient that the heads 3 be able to move in the left-right direction relative to the flushing boxes 51 and 52, the caps 41 to 44, the wipers 711, 721, 731 and 741, and the platen 12. In other words, a configuration may be adopted in which the carriage 6 is fixed to the frame body 2, and the flushing boxes 51 and 52, the caps 41 to 44, the wipers 711, 721, 731 and 741, and the platen 12 are able to move in the left-right direction. When the platen 12 is move in the left-right direction, a configuration may be adopted in which one or some of the flushing boxes 51 and 52, the caps 41 to

44, or the wipers 711, 721, 731 and 741 are able to move in the left-right direction, such as the flushing boxes 51 and 52, for example.

The wipers 711, 721, 731 and 741 may move between a position at which contact with the nozzle surfaces 311, 321, 331, and 341 is possible and a position at which they are separated downward from the nozzle surfaces 311, 321, 331, and 341, by each of the wipers 711, 721, 731 and 741 moving in the up-down direction, for example. Each of the wipers 711, 721, 731 and 741 may be fixed at a position at which the contact with the nozzle surfaces 311, 321, 331, and 341 is possible. Some or all of the wipers 711, 721, 731 and 741 may be configured to be integrated. For example, the wipers 711 and 721 may be configured by a single wiper, or the wipers 711 and 731 may be configured by a single wiper.

The flushing boxes 51 and 52 may be configured by a single flushing box. In other words, the receivers 512 and 522 may be joined together. In the left-right direction, as long as the width D2 of the receiver 512 is smaller than the nozzle row maximum distance D1, the width D2 may be larger than the nozzle row minimum distance D3.

The shape of the flushing boxes 51 and 52 is not limited to that of the above-described embodiment. For example, the printer 1 may be provided with a plate in place of the flushing boxes 51 and 52. The plate extends, in the non-printing region 19, in the front-rear direction and in the left-right direction to the right of the wiper mechanisms 71 and 72. In this case, the receivers 512 and 522 are formed in the upper surface of the plate.

The printer 1 can change, as appropriate, the arrangement positions of the flushing box 51, the caps 41 and 42, the wipers 711 and 721, and the platen 12 in the left-right direction. For example, the flushing box 51 may be positioned further to the left than the caps 41 and 42, the flushing box 51 may be positioned between the wipers 711 and 721 and the caps 41 and 42 in the left-right direction, or the flushing box 51 may be positioned further to the right than the platen 12. Either the caps 41 and 42 or the wipers 711 and 721, or both the caps 41 and 42 and the wipers 711 and 721 may be positioned further to the right than the platen 12. The wipers 711 and 721 may be positioned further to the left than the caps 41 and 42. In a similar manner, the printer 1 may change, as appropriate, the arrangement positions of the flushing box 52, the caps 43 and 44, the wipers 731 and 741, and the platen 12 in the left-right direction.

In the above-described embodiment, the types of color of the ink discharged from the heads 3 is not limited to those of the above-described embodiment. The printer 1 may discharge a transparent ink from the heads 3, or may discharge a pretreatment agent, a post-treatment agent, or the like. The pretreatment agent is a type of the ink, and is, for example, a base coat agent. The pretreatment agent is discharged onto the print medium before a base is formed by the white ink. The pretreatment agent improves fixing of the white ink onto the print medium, and color development of the color inks. The pre-treatment agent is an aqueous solution that includes a cationic polymer or a multivalent metal salt, for example. The post-treatment agent is a type of the ink, and is, for example, a coating agent. The post-treatment agent is discharged onto a color image formed by the color inks. The post-treatment agent protects the color image, and improves the glossiness of the color image. The post-treatment is, for example, an aqueous solution that includes a resin emulsion or a crosslinking agent.

In place of the CPU 81, a microcomputer, application specific integrated circuits (ASICs), a field programmable gate array (FPGA) or the like may be used as a processor. The main processing may be performed as distributed processing by a plurality of the processors. It is sufficient that the non-transitory storage media, such as the ROM 82, the flash memory 84, and the like be a storage medium capable of storing information, regardless of a period of storing the information. The non-transitory storage medium need not necessarily include a transitory storage medium (a transmitted signal, for example). The control program may be downloaded from a server connected to a network (not shown in the drawings) (in other words, may be transmitted as transmission signals), and may be stored in the ROM 82 or the flash memory 84. In this case, the control program may be stored in a non-transitory storage medium, such as an HDD provided in the server.

The apparatus and methods described above with reference to the various embodiments are merely examples. It goes without saying that they are not confined to the depicted embodiments. While various features have been described in conjunction with the examples outlined above, various alternatives, modifications, variations, and/or improvements of those features and/or examples may be possible. Accordingly, the examples, as set forth above, are intended to be illustrative. Various changes may be made without departing from the broad spirit and scope of the underlying principles.

What is claimed is:

1. A printer comprising:

a first nozzle surface including a first nozzle row configured by a plurality of nozzles discharging ink in a discharge direction being aligned in a sub-scanning direction orthogonal to the discharge direction;

a second nozzle surface including a second nozzle row configured by a plurality of the nozzles being aligned in the sub-scanning direction, the second nozzle row being positioned, with respect to the first nozzle row, in a main scanning direction orthogonal to the sub-scanning direction and the discharge direction;

a flushing receiving member configured to move in the main scanning direction relative to the first nozzle surface and the second nozzle surface, the flushing receiving member being a member provided with a receiver having a width smaller than an interval between the first nozzle row and the second nozzle row in the main scanning direction;

a driver configured to perform discharge driving of discharging the ink from the nozzles, and non-discharge driving of not discharging the ink from the nozzles and oscillating the ink inside the nozzles;

a processor; and a memory storing computer-readable instructions that, when executed by the processor, cause the processor to perform a process comprising:

performing first flushing processing, the first flushing processing being processing performed in a state of a first target nozzle row being caused to face the receiver in the discharge direction, the first target nozzle row being one of the first nozzle row or the second nozzle row, and the first flushing processing outputting a discharge signal, to the driver, of causing the driver to perform the discharge driving to discharge the ink from at least one of the nozzles of the first target nozzle row, and outputting a non-discharge signal, to the driver, of causing the driver to perform the non-discharge driving to not discharge the ink from at least one of the nozzles of a second target nozzle row and oscillate the ink inside at least one of the nozzles of the second target nozzle row, the second target nozzle row being the other of the first nozzle row or the second nozzle row wherein the discharge signal and the non-discharge signal is output in parallel.

2. The printer according to claim 1, wherein the computer-readable instructions stored in the memory further instruct the processor to perform a process comprising:

second flushing processing, the second flushing processing being processing performed in a state of the second target nozzle row being caused to face the receiver in the discharge direction, and the second flushing processing causing the driver to perform the discharge driving to discharge the ink from at least one of the nozzles of the second target nozzle row, and causing the driver to perform the non-discharge driving to not discharge the ink from at least one of the nozzles of the first target nozzle row.

3. The printer according to claim 2, further comprising: a cap configured to move in the main scanning direction relative to the first nozzle surface and the second nozzle surface and to closely adhere to the first nozzle surface and the second nozzle surface, wherein the computer-readable instructions stored in the memory further instruct the processor to perform processes comprising:

performing print processing of discharging the ink onto a print medium from a plurality of the nozzles configuring at least one of the first nozzle row or the second nozzle row, in a state of at least one of the first nozzle row and the second nozzle row being caused to face, in the discharge direction, a platen on which the print medium is placed, performing the first flushing processing after the print processing, in a state of the first nozzle row, as the first target nozzle row, being caused to face the receiver in the discharge direction, performing the second flushing processing after the first flushing processing, in a state of the second nozzle row, as the second target nozzle row, being caused to face the receiver in the discharge direction, and performing capping processing, after the second flushing processing, of closely adhering the cap to the first nozzle surface and the second nozzle surface in a state of the first nozzle row and the second nozzle row being positioned at a cap position facing the cap in the discharge direction.

4. The printer according to claim 3, further comprising: a wiper positioned between the flushing receiving member and the cap in the main scanning direction, the wiper being configured to move in the main scanning direction relative to the first nozzle surface and the second nozzle surface, and to come into contact with the first nozzle surface and the second nozzle surface, wherein the second nozzle row is positioned, in the main scanning direction, in a first direction with respect to the first nozzle row, the first direction being a direction from the flushing receiving member toward the cap, and the computer-readable instructions stored in the memory further instruct the processor to perform processes comprising:

performing the print processing;

performing first movement processing, after the print processing, of moving the first nozzle surface and the second nozzle surface in the main scanning direction relative to the wiper, and positioning the first nozzle row and the second nozzle row at a predetermined position further in the first direction than the wiper;

performing first wiping processing, after the first movement processing, of moving the first nozzle surface and the second nozzle surface relative to the wiper in a second direction opposite to the first direction in the main scanning direction, in a state of the wiper being able to come into contact with the first nozzle surface, and causing the first nozzle row to face the receiver in the discharge direction;

performing the first flushing processing after the first wiping processing;

performing second wiping processing, after the first flushing processing, of moving the first nozzle surface and the second nozzle surface relative to the wiper in the second direction, in a state of the wiper being able to come into contact with the second nozzle surface, and causing the second nozzle row to face the receiver in the discharge direction;

performing the second flushing processing after the second wiping processing;

performing second movement processing, after the second flushing processing, of moving the first nozzle surface and the second nozzle surface in the first direction relative to the cap, and positioning the first nozzle row and the second nozzle row at the cap position; and performing the capping processing after the second movement processing.

5. The printer according to claim 2, further comprising: a cap positioned, in the main scanning direction, opposite, with respect to the flushing receiving member, to a platen on which a print medium is placed, the cap being configured to move in the main scanning direction relative to the first nozzle surface and the second nozzle surface and to closely adhere to the first nozzle surface and the second nozzle surface, wherein the second nozzle row is positioned, in the main scanning direction, in a first direction with respect to the first nozzle row, the first direction being a direction from the flushing receiving member toward the cap, and the computer-readable instructions stored in the memory further instruct the processor to perform processes comprising:

performing capping release processing of releasing a close adhesion of the cap closely adhered to the first nozzle surface and the second nozzle surface, in a state of the first nozzle row and the second nozzle row being positioned at a cap position of facing the cap in the discharge direction;

performing the first flushing processing, after the capping release processing, in a state of the first nozzle row, as the first target nozzle row, being caused to face the receiver in the discharge direction;

performing the second flushing, processing after the first flushing processing, in a state of the second nozzle row, as the second target nozzle row, being caused to face the receiver in the discharge direction; and performing print processing, after the second flushing processing, of discharging the ink onto the print medium from a plurality of the nozzles configuring at least one of the first nozzle row or the second nozzle row, in a state of the at least one of the first nozzle row or the second nozzle row being caused to face the platen in the discharge direction.

6. The printer according to claim 1, wherein the computer-readable instructions stored in the memory further instruct the processor to perform a process comprising:

in the first flushing processing, causing the driver to perform the discharge driving to discharge the ink from at least one of the nozzles of the first target nozzle row, during a predetermined time period, and causing the driver to perform the non-discharge driving to not discharge the ink from at least one of the nozzles of the second target nozzle row, during the predetermined time period from a start of the discharge driving to discharge the ink from at least one of the nozzles of the first target nozzle row.

7. The printer according to claim 1, wherein the first nozzle surface discharges, from a plurality of the nozzles configuring the first nozzle row, first ink whose fluidity is less likely to deteriorate than second ink discharged by the second nozzle surface from a plurality of the nozzles configuring the second nozzle row, and the computer-readable instructions stored in the memory further instruct the processor to perform processes comprising:

performing the first flushing processing in a state of the first nozzle row, as the first target nozzle row, being caused to face the receiver in the discharge direction; and performing a second flushing processing, the second flushing processing being processing performed in a state of the second nozzle row being caused to face the receiver in the discharge direction, and the second flushing processing causing the driver to perform the discharge driving to discharge the second ink from at least one of the nozzles of the second nozzle row, and not causing the driver to perform either the discharge driving or the non-discharge driving, in all of a plurality of the nozzles of the first nozzle row.

8. The printer according to claim 1, further comprising:

a third nozzle surface including a third nozzle row configured by a plurality of the nozzles being aligned in the sub-scanning direction, the plurality of nozzles configuring the third nozzle row discharging first ink whose fluidity is less likely to deteriorate than second ink discharged from a plurality of the nozzles configuring the first nozzle row and the second nozzle row; and a fourth nozzle surface including a fourth nozzle row configured by a plurality of the nozzles discharging the first ink whose fluidity is less likely to deteriorate being aligned in the sub-scanning direction, and the fourth nozzle surface being positioned in the main scanning direction with respect to the third nozzle surface, wherein the computer-readable instructions stored in the memory further instruct the processor to perform a process comprising:

performing a second flushing processing, the second flushing processing being processing performed in a state of a third target nozzle row being caused to face the receiver in the discharge direction, the third target nozzle row being one of the third nozzle row or the fourth nozzle row, and the fourth flushing processing causing the driver to perform the discharge driving to discharge the first ink from at least one of the nozzles of the third target nozzle row, and not causing the driver to perform either the discharge driving or the non-discharge driving, in all of the nozzles of a fourth target nozzle row, the fourth target nozzle row being the other of the third nozzle row or the fourth nozzle row.

9. A control method of a printer including a first nozzle surface that includes a first nozzle row configured by a plurality of nozzles discharging ink in a discharge direction being aligned in a sub-scanning direction orthogonal to the discharge direction, a second nozzle surface that includes a second nozzle row configured by a plurality of the nozzles being aligned in the sub-scanning direction, the second nozzle row being positioned, with respect to the first nozzle row, in a main scanning direction orthogonal to the sub-scanning direction and the discharge direction, a flushing receiving member that moves in the main scanning direction relative to the first nozzle surface and the second nozzle surface and is a member provided with a receiver having a width smaller than an interval between the first nozzle row and the second nozzle row in the main scanning direction, and a driver that performs discharge driving of discharging the ink from the nozzles, and non-discharge driving of not discharging the ink from the nozzles and oscillating the ink inside the nozzles, the control method comprising:

performing first flushing processing, the first flushing processing being processing performed in a state of a first target nozzle row being caused to face the receiver in the discharge direction, the first target nozzle row being one of the first nozzle row or the second nozzle row, and the first flushing processing outputting a discharge signal, to the driver, of causing the driver to perform the discharge driving to discharge the ink from at least one of the nozzles of the first target nozzle row, and outputting a non-discharge signal, to the driver, of causing the driver to perform the non-discharge driving to not discharge the ink from at least one of the nozzles of a second target nozzle row and oscillate the ink inside at least one of the nozzles of the second target nozzle row, the second target nozzle row being the other of the first nozzle row or the second nozzle row wherein the discharge signal and the non-discharge signal is output in parallel.

10. A non-transitory computer-readable medium storing computer-readable instructions to be executed by a computer of a printer including a first nozzle surface that includes a first nozzle row configured by a plurality of nozzles discharging ink in a discharge direction being aligned in a sub-scanning direction orthogonal to the discharge direction, a second nozzle surface that includes a second nozzle row configured by a plurality of the nozzles being aligned in the sub-scanning direction, the second nozzle row being positioned, with respect to the first nozzle row, in a main scanning direction orthogonal to the sub-scanning direction and the discharge direction, a flushing receiving member that moves in the main scanning direction relative to the first nozzle surface and the second nozzle surface and is a member provided with a receiver having a width smaller than an interval between the first nozzle row and the second nozzle row in the main scanning direction, and a driver that performs discharge driving of discharging the ink from the nozzles, and non-discharge driving of not discharging the ink from the nozzles and oscillating the ink inside the nozzles, the computer-readable instructions, when executed by the computer, causing the computer to perform a process comprising:

performing first flushing processing, the first flushing processing being processing performed in a state of a first target nozzle row being caused to face the receiver in the discharge direction, the first target nozzle row being one of the first nozzle row or the second nozzle row, and the first flushing processing outputting a discharge signal, to the driver, of causing the driver to perform the discharge driving to discharge the ink from at least one of the nozzles of the first target nozzle row, and outputting a non-discharge signal, to the driver, of causing the driver to perform the non-discharge driving to not discharge the ink from at least one of the nozzles of a second target nozzle row and oscillate the ink inside at least one of the nozzles of the second target nozzle row, the second target nozzle row being the other of the first nozzle row or the second nozzle row wherein the discharge signal and the non-discharge signal is output in parallel.

* * * * *